United States Patent

Kawabe et al.

Patent Number: 5,812,176
Date of Patent: Sep. 22, 1998

[54] IMAGE FORMING APPARATUS WITH ARRAY-FORMED RECORDING ELEMENTS

[75] Inventors: Toru Kawabe; Tuyosi Hattori, both of Hino, Japan

[73] Assignee: Konica Corporation, Tokyo, Japan

[21] Appl. No.: 739,121

[22] Filed: Oct. 25, 1996

[30] Foreign Application Priority Data

Nov. 2, 1995 [JP] Japan ................................... 7-285874
Nov. 14, 1995 [JP] Japan ................................... 7-295518
Nov. 14, 1995 [JP] Japan ................................... 7-295519

[51] Int. Cl.⁶ .............................. B41J 3/21; H04N 1/036
[52] U.S. Cl. .......................... 347/240; 347/237; 358/298
[58] Field of Search ................................... 347/240, 237, 347/131, 132; 358/298, 302

[56] References Cited

U.S. PATENT DOCUMENTS 5,586,055  12/1996  Ng et al. .............................. 358/298 X
5,621,453   4/1997  Fujita et al. ............................. 347/240

FOREIGN PATENT DOCUMENTS 62-134624   6/1987  Japan .
63-24253    2/1988  Japan .
63-87078    4/1988  Japan .
63-189269   8/1988  Japan .
63-302077  12/1988  Japan .
6-270471    9/1994  Japan .

*Primary Examiner*—Joan H. Pendergrass
*Attorney, Agent, or Firm*—Frishauf, Holtz, Goodman, Langer & Chick

[57] ABSTRACT

In an apparatus for forming an image on a recording medium by using a group of recording elements including a plurality of recording elements aligned in an array form of at least a single line, a controller controls each recording element so as to be driven plural times for each pixel in accordance with image data and controls the plurality of recording elements in such a way that while one group of the plurality of recording elements is in an operable condition as working elements, neighboring recording elements located next to the working elements are controlled to be in an inoperable condition as non working elements.

16 Claims, 18 Drawing Sheets

PIXEL No.

PIXEL No.

FIG. 14

| STEP | 1 | 2 | 3 | 4 | 5 | 6 | 7 | 8 | 9 | 10 | 11 | 12 | ... |
|---|---|---|---|---|---|---|---|---|---|---|---|---|---|

ELEMENT No.

| No.1 | A | B | C | D | A | B | C | D | A | B | C | D |
| No.2 | C | D | A | B | C | D | A | B | C | D | A | B |
| No.3 | B | A | D | C | B | A | D | C | B | A | D | C |
| No.4 | D | C | B | A | D | C | B | A | D | C | B | A |
| No.5 | A | B | C | D | A | B | C | D | A | B | C | D |
| No.6 | C | D | A | B | C | D | A | B | C | D | A | B |
| No.7 | B | A | D | C | B | A | D | C | B | A | D | C |
| No.8 | D | C | B | A | D | C | B | A | D | C | B | A |
| No.9 | A | B | C | D | A | B | C | D | A | B | C | D |

TARGET BIT 5 BIT (32m×4)    4 BIT (16m×4)    3 BIT (8m×4)

y = a & b & c y = a | b | c y = a &( b | c)

y = a |( b & c)

A : DRIVE IN ACCORDANCE WITH A TARGET PIXEL

A : DRIVE IN ACCORDANCE WITH A TARGET PIXEL

A : DRIVE IN ACCORDANCE WITH A TARGET PIXEL

IMAGE FORMING APPARATUS WITH ARRAY-FORMED RECORDING ELEMENTS

BACKGROUND OF THE INVENTION

The present invention relates to apparatus for recording a multi-gradation image in accordance with image data, and more specifically to image recording apparatus for recording a dot image in which a single dot is formed by multi-recording with a same recording element.

Recently, an apparatus for recording an image in accordance with image data is required which can achieve a high quality image recording from a view point of resolution, gradation, color reproducibility. For example, in a figure picture, a continuous gradation image superior in gradation such as reproduction of a delicate contrast on a skin is required. As an image recording apparatus which copes with such a demand and has merit in terms of a small size and low cost, an apparatus for recording a dot image on a recording medium by using an array recording head in which a plurality of recording elements are aligned has been well known.

More concretely, examples of an array recording head, include a combination of a vacuum fluorescent printing head (hereinafter refer to VFPH) and color filters, a combination of a light source and a liquid crystal shutter array described in Japanese Patent Application Publication No. 134624/1987, a combination of a light source and a PLZT shutter array described in 189269/1988.

As a technique to express multi gradation by an array recording head, there is a method, such as the Dither method, to combine a plurality of binary images so as to form a multi gradation pixel. In this method, since a driving control for each light emitting element in an array is binary, there are merits that a structure of a driving circuit for the array is simple and an apparatus can be made at low cost in a small size. The expression by this method is partial, with a sacrifice in resolution. Therefore, there is a problem that an image quality is insufficient in terms of resolution.

Further, there is a method to conduct a selection control to change a level of each recording element independently of others so as to change, for example, a strength of light emission, a strength of heat emission or a driving time period of each recording element of an array recording head. In order to obtain a superior gradation with this method, since it is necessary to make change levels more than at least 200 levels, a driving circuit for each light emitting element may become complicate, a large size and high cost. As a result, there is a problem in that the merit in terms of a small size and low cost with the use of an array head may be lost.

As a method to express a multi gradation by using an array recording head without causing the above problems, a technique to record image data of M bits (M is an integer not smaller than 2) of a pixel in a form of a pixel which changes $2^M$ levels by light emissions of at most M times with the same LED is know by Japanese Patent Application Publication No. 281672/1987. In this technique, a light emitting time period of each of the light emissions of M times is changed in geometrical progression $2^0, 2^1, 2^2 \text{ - - - } 2_M-1$. That is, the recording is conducted in such a way that light is not emitted for a 0 density level pixel, light of $2^0$ level is emitted one time for a 1 density level pixel, light of $2^1$ level is emitted one time for a 2 density level pixel, light of $2^0$ level and $2^1$ level are emitted total two times for a 3 density level pixel, light of $2^2$ level is emitted one time for a 4 density level pixel, light of $2^0$ to $2^{M-1}$ are emitted total M times for a $2^M-1$ density level pixel. With this technique, the problem found in the Dither method whereby a pixel density becomes coarse is avoided. Further, if a light emission amount or a light emitting time period of a light emitting element is changed in 8 levels, since a pixel can be recorded in 256 density levels including 0 density level, a driving circuit for each pixel does not become so complicate, and the benefit of a small size and low cost obtained by using an array recording head are not lost.

However, in the above technique, there is a problem that a discontinuity "step up/down" takes place in gradation depending on a dynamic responding characteristics of the light emitting element or a light sensitive characteristics of the light sensitive material.

Further, in the case of an array recording head, deviation in recording characteristics of each recording element constituting the array may cause irregularities, resulting in degrading an image quality. To counter this problem, with a technique to change image data for each recording element so as to correct the deviation, a process to correct the deviation is conducted, thereafter an image is recorded. At this time, under the influence of "step up/down" in gradation, there is a problem that irregularities take place on an uniform density portion or a portion having an almost uniform density. In the case that the recording is conducted by driving the recording element for a certain time period, when the recording is conducted by a different number of driving times even if the total driving time period is the same, a density of a recorded image becomes different. It is considered that the above-mentioned problem of "step up/down" may be caused by such a difference in density. Further, the responding characteristics of the recording element to the driving and the recording characteristics of the recording medium may be related to this problem.

Such "step up/down" in gradation may greatly take place in the case of recording an image on a silver halide light sensitive material.

For example, when an exposure is conducted on a silver halide light sensitive material for a given time with a light source having a given luminance, a density after a development process on a silver halide light sensitive material which is exposed a single time becomes different from that on a silver halide light sensitive material which is exposed two times with a half exposure time period even if the total exposure time between them is the same. This phenomenon is so called an intermittence exposure effect.

The present inventors consider that the characteristics of the silver halide light sensitive material may have a great affect on "step up/down" in gradation. However, detailed information has not yet obtained. Further, since the silver halide light sensitive material has a soft gradation property and is a recording medium superior in gradation, one possible cause of "step up/down" may be considered to be that discontinuity in gradation becomes conspicuous on an image recorded thereon.

In order to avoid "step up/down" in gradation, a technique to correct correlation between a driving energy for a recording element and a density of a pixel formed by the driving energy has been studied. For example, a technique to set a light emitting time period for each bit in accordance with a characteristics of a light emitting element or a light sensitive material is disclosed by Japanese Patent Application Publication No. 87078/1988. However, in this technique, the setting an appropriate light emitting time period for each bit is not easy, because the setting is conducted on a trial and error basis. Accordingly, even if a certain improvement may be obtained in gradation, it may be difficult to eliminate actually "step up/down" overall possible gradation. As a result, for example, in the case of reproducing delicate contrast on a skin of a figure, discontinuous contrast remains on it and the reproducing becomes unnatural. Consequently, there is a problem that a recorded image quality may be insufficient in terms of continuous gradation.

The present invention has been conceived to counter the above problems. That is, a first objective of the present invention is to provide an image recording apparatus to record a high quality dot image on a recording medium by using an array recording head. With the apparatus, multi-level image superior in gradation can be recorded in accordance with image data without causing "step up/down" in gradation. The apparatus is made in a small size and low cost.

Another problem to be solved by the invention is now explained.

In the case that a silver salt light sensitive material is imagewise exposed with the array recording head, the silver salt light sensitive material is conveyed relatively in a direction perpendicular to an aligning direction of light emitting elements while the light emitting elements of the array recording head are driven simultaneously so that dot image exposures are conducted simultaneously in a form of a line. As a result, tow dimensional dot image exposure is conducted so that an image is formed on the silver salt light sensitive material.

As a result of detailed investigation by the present inventors as to image quality of an image recorded by an image recording apparatus with the use of the above array recording head, in the case of recording the silver salt light sensitive material, since the sharpness of the image is different between a aligning direction of light emitting elements and a direction perpendicular to the aligning direction, there are problems that the sharpness of a recorded image becomes different and the density and the thickness of a character or a line become different, depending on a recording direction such as the case that the same image is recorded in a longitudinal direction or in a transverse direction.

The second objective of the present invention is to provide an image recording apparatus capable of recording a high quality image on a silver salt light sensitive material without causing a difference in sharpness between the aligning direction of light emitting elements of the array recording head and a direction perpendicular to the aligning direction.

Further, another problem to be solved by the invention is now explained.

In the above recording elements arranged so as to correspond to pixels of a recorded image, a neighboring effect may take place, because a plurality of elements are provided in a parallel arrangement in the array recording head. That is, the following phenomenon occurs: an operating condition of an element is changed depending on ON or OFF of a neighboring element. The phenomenon is caused by various causes in a recording head depending on a type of recording elements.

Next, an action of each recording element in the time of light emission or heat emission is explained.

Vacuum Fluorescent Tube Array

Depending on the condition that a neighboring element of the vacuum fluorescent tube array emits light or no light, an electric field in the vicinity of the neighboring element is changed so that a light intensity of an element is affected. A light intensity of the element in the case that the neighboring element emits light is increased more than that in the case that the neighboring element emits no light.

LED Array

Since light emitting efficiency of a LED array is relatively low, the LED array generates great heat. A rise in the temperature of the LED due to the heat reduces the light intensity. Therefore, in this case, due to the light emission of the neighboring element, a light intensity of an element to record an image is lowered.

Thermal Printing Head

In the case of recording a half tone image with the thermal printing head, a control is needed for a thermal history by a previous recording in at least one previous line. Further, since a thermal responding characteristics in the time that an element and a neighboring element are simultaneously switched ON is different from that in the time that only the element is switched ON, the control becomes complicate. Furthermore, the thermal head is composed of a plurality of heat generating registers, and a temperature of a heat generating register in the vicinity of an end portion of the thermal head becomes relatively high or low due to heat accumulation or heat diffusion in comparison with other heat generating registers, causing the phenomenon that a printing density by the end portion becomes higher or lower than that by other portion.

Due to the neighboring effect, strictly speaking, it becomes difficult to control each recording element independently of others in the array head. For example, even if an image signal for each recording element is adjusted so as to obtain an uniform image, since the neighboring effect may be changed by this adjustment, irregularities may still remain in the image. That is, since operation irregularities exist among the recording elements on the array head, a technique to conduct a correction by increasing or decreasing a driving time period of each recording element in order to obtain an uniform image is adapted. However, the correction technique causes differences in operating condition among the recording elements and changes influence of the neighboring effect, resulting in causing irregularities in a recorded image.

In a fluorescent print head comprising a plurality of control electrode plates, a cut-off voltage is applied to a no-light emitting control electrode plate and a light emitting control electrode plate positioned next to the no-light emitting control electrode plate is affected by the cut-off voltage. In order to reduce the influence of the cut-off voltage, Japanese Patent Application Publication No. 302077/1988 discloses to separate the plurality of control electrode plates into plural groups. However, the Publication does not teach a technique to reduce irregularities taking place on a silver halide light sensitive material and a technique to reduce irregularities on an image in the case that the image is formed by emitting light plural times for each pixel.

A third objective of the present invention is to provide an image recording apparatus capable of reducing the neighboring effect caused by the operation of the neighboring recording elements and realizing a high speed recording.

SUMMARY OF THE INVENTION

As a result of successive studies conducted by the present inventors regarding "step up/down" in gradation, as a surprising matter, the inventors got a viewpoint to consider that "step up/down" in gradation may be caused by the neighboring effect by a neighboring recording element in the time of recording. That is, since an interaction among the recording elements in the time of recording seems to cause "step up/down" in gradation, the inventors got a hint that if the neighboring effect is reduced, "step up/down" in gradation may be effectively reduced.

The present invention was attained based on the above viewpoint of the present inventors. In an image recording apparatus comprising at least a group of recording elements composed of a plurality of recording elements which arranged in a form of an array of a single line or plural lines and a control means for driving each recording element of the group of recording elements plural times for each pixel in accordance with image data, and recording an image on a recording medium, the above first objective is attained by the structure that when a recording element among the group of recording elements is in the driven condition, the control means does not drive another recording element neighboring to the driven recording element. Since an image of pixels is not recorded by driving simultaneously at least recording elements neighboring to each other in a direction in which an array of recording elements is aligned, discontinuous "step up/down" in gradation may be prevented from taking place on the image composed of pixels recorded by driving each recording element plural times for each pixel. As a result, multi-level image superior in gradation can be recorded, and the following effects can be obtained: The small sized apparatus and low cost can be attained by utilizing a merit of an array recording head.

With the structure that the recording medium on which an image is recorded is a silver salt light sensitive material, the improvement in "step up/down" in gradation becomes greater. When a silver salt light sensitive material is a silver salt color light sensitive material, the improvement in "step up/down" in gradation becomes greater. When a silver salt color light sensitive material comprises a silver halide emulsion layer containing silver chloride of 90 mol% or more, the improvement for a conventional image recording apparatus becomes particularly greater.

With the structure that a silver salt light sensitive material as the recording medium comprises a reflective supporting member, the improvement in "step up/down" in gradation becomes greater. When control means to conduct a driving control for a recording element separates a group of recording elements aligned in a form of an array into N pieces of sub-groups, wherein N is a natural number not smaller than 2 and a recording element in the same sub-group is selected from every (N-1) pieces of the group of the arrayed-formed recording elements, and when the control means puts one sub-group in operable condition while putting another sub-groups in inoperable condition, a simple effective control to prevent neighboring pixels in the aligned direction from emitting light simultaneously can be conducted without making the exposure control section greatly complicated. When a number N to separate a group of recording elements into N pieces of sub-groups is not smaller than 4, the improvement in "step up/down" in gradation becomes specifically greater.

With the structure that while the control means puts a certain recording element in operable condition, at least one sub-group among sub-groups put in inoperable condition has a pixel arrangement density not less than 200 dpi, the improvement in "step up/down" in gradation becomes greater. In the structure that while a certain recording element among a group of recording elements is put in operable condition, recording elements neighboring the operable recording element are put in inoperable condition, when one of the group of recording elements is a vacuum fluorescent tube array whose anode voltage and grid voltage are controllable and control means controls the vacuum fluorescent tube array so as to be driven under the condition that the ratio of the anode voltage to the grid voltage is 0.3 to 0.9, an insufficient light amount of exposure can be avoided and the improvement in "step up/down" in gradation becomes greater.

With at least one of the following structures, correction irregularities caused by "step up/down" can be avoided and deviation in driven amount of each recording element among the group of recording elements can be corrected so that "step up/down" in gradation can be avoided, density irregularities can be reduced, and a high quality image with continuous gradation cab be recorded.

In the structure that while a certain recording element among a group of recording elements is put in operable condition, recording elements neighboring the operable recording element are put in inoperable condition, the control means drives each recording element after deviation in driven amount of each recording element among the group of recording elements is corrected.

Correction amount for exposure amount of each recording element is obtained under the condition that the recording medium is a silver salt light sensitive material, the recording element is a light amount controllable element, light amount data of each recording element is obtained while a plurality of recording elements among the group of recording elements to be corrected are driven, and the correction amount is obtained based on the light amount data.

A silver salt light sensitive material is exposed while a plurality of recording elements among the group of recording elements to be corrected are driven and the light amount data is obtained by measuring densities on the exposed silver salt light sensitive material.

Correction amount for exposure amount of each recording element is obtained in such a manner that a relation between light amount data and densities on the exposed silver salt light sensitive material is obtained, the densities are converted into light amount data based on the relation and the correction amount are obtained.

Light amount data are obtained in such a manner that a plurality of recording elements to be corrected are driven simultaneously and the light amount data are obtained by measuring light emission of each recording element.

Correction amount for exposure amount of each recording element is obtained by using light amount data measured while a plurality of recording elements are driven and light amount data measured while only the recording element is driven.

Light amount data are obtained by measuring light emission for each recording element to be corrected.

In the structure that while a certain recording element among a group of recording elements is put in operable condition, recording elements neighboring the operable recording element are put in inoperable condition, the control means controls at least one of the group of recording elements so as to conduct exposure with gradation not less than 512 levels.

In the structure that while a certain recording element among a group of recording elements is put in operable condition, recording elements neighboring the operable recording element are put in inoperable condition, the control means controls at least one of the group of recording elements so as to conduct exposure with gradation not higher than 65536 levels, "step up/down" in gradation can be avoided, density irregularities can be reduced, a high quality image formation is not failed, the apparatus can be simplified at low cost, and further it becomes possible to provide an image forming apparatus in which a processing speed is increased.

As a result of the inventor's successive studies in order to attain the second objective, the inventors found the following solving means.

In the silver salt light sensitive material, a light sensitive layer is formed by a layer of a binder containing silver halide particles of light sensitive material. In particular, in the case of a color silver salt light sensitive material, plural layers are formed by plural light sensitive layers differing in color sensitivity. For example, a color paper is constructed by seven layers. Due to the multi-layers, the color papar has a characteristics that multiple reflection or scattering of light take place between layers or in the layer in the time of imagewise exposure, resulting in that an exposed image become blurred. Further, the silver salt light sensitive material has a characteristics that when the same portion is exposed, even if the total exposure amount (the total energy amount) is the same between a case that the portion is exposed simultaneously by plural light emitting elements and another case that the portion is exposed intermittently plural times with time gap between exposures, the density of the portion after development becomes different between the cases.

Due to the above characteristics, the above problem seems to be caused by the following reasons. That is, since exposure timings of neighboring pixels are different from each others, the exposed image of each pixel becomes blurred, resulting in density difference.

Accordingly, the inventors conceived that the above problem may be solved by changing a method of conducting a line-shaped image exposure with an array recording head, whereby an image quality of a recorded image on a silver halide light sensitive material.

That is, the second objective of the present invention can be attained by the following apparatus. In an apparatus comprising a group of recording elements formed by aligning a plurality of recording elements emitting the same color light emission in a single line or plural lines and control means for controlling the recording elements to be driven based on image data, wherein an exposure is conducted for a silver salt light sensitive material conveyed relatively in a direction perpendicular to the aligning direction of the group of recording elements so as to record an image on it; the control means of the apparatus to attain the objective controls in such a manner that while a certain recording element among a group of recording elements is put in operable condition, recording elements neighboring the operable recording element are put in inoperable condition. Since an image is not formed by controlling the neighboring recording elements aligned in the array so as to emit light emissions simultaneously, a high quality image having less deviation in sharpness in a direction perpendicular to the aligning direction of recording elements in the array can be recorded.

The third objective of the present invention can be attained by the following apparatus. In a apparatus comprising array-shaped recording elements aligned in a single line or plural lines and control means for controlling a driving time period or a number of driving times of the recording elements in order to record plural pixels in multi-levels, the apparatus to attain the objective further comprises recording element control means for controlling a recording element so as to change a gap distance between it and a nearest recording element depending on the density level in a neighborhood of a pixel recorded by the recording element, wherein the nearest recording element is positioned nearest to the recording element among the recording elements driven simultaneously. The recording element control means controls the recording element so as to make the gap distance smaller when the density level in the neighborhood is high, on the other hand, to make the gap distance larger when the density level is low. If the gap distance is n (n being a natural number) in the case that density signals of all pixels in a neighborhood of a certain pixel are higher than a density on a boundary region, when density signals of all pixels in a neighborhood of a certain pixel are lower than a density on a boundary region, the gap distance is 2n. The recording element is subjected to ON-OFF control by the control means in accordance with a value of each power of image data expressed in binary system with "m" power, the ON condition of the recording element is driven in accordance with a weight of each power, density recording is conducted in $2_m$ levels within a range of 0 to $2^{m-1}$ for the image data of each pixel, the boundary regions of density signals are $2^{m-1}, 2^{m-2}, ---, 2^k$ (where k is an integer not smaller than −1 and not larger than −1).

Incidentally, an array in a form of a single line is not only a single line as shown in FIG. 10(a), but also includes a staggered arrangement as shown in FIG. 10(b). Further, a pixel neighboring in the aligning direction is a pixel corresponds to a neighboring number in the case of numbering the recording elements in the order of the aligning direction as shown in FIGS. 10(a) and 10(b). Furthermore, a array in a form of plural lines means an arrangement in which an array form as shown in FIGS. 10(a) and 10(b) stands in plural parallel lines.

BRIEF DESCRIPTION OF THE DRAWINGS

FIG. 14 is an illustration of operations showing operating conditions of recording element arrays of the present invention.

DETAILED DESCRIPTION OF THE PREFERRED EMBODIMENT

Figure 1:
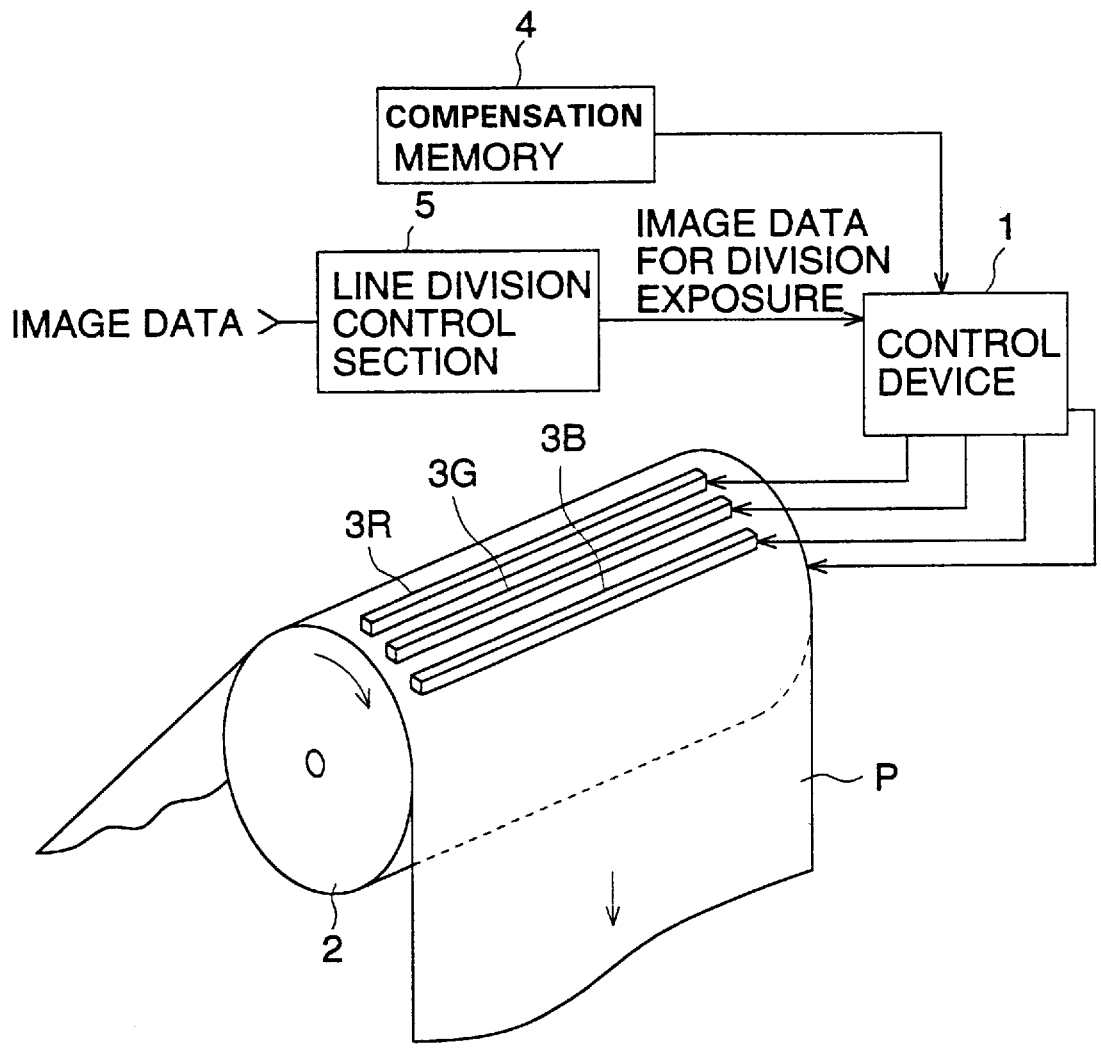
FIG. 1 is a perspective view of the outline structure showing an example of an image recording apparatus of the present invention.

Referring to the drawings, the present invention will be described below, however, the embodiment of the present invention is not limited to this description.

FIG. 1 is a perspective view of a general structure showing an example of an image recording apparatus of the present invention. In the apparatus shown in FIG. 1, a sheet of color photographic printing paper P of a silver halide photosensitive material (hereinafter, it will be simply referred to as printing paper), which is controlled by a controlling apparatus 1 for the overall apparatus and fed by rollers, not shown in the drawing, is conveyed while being supported by a supporting drum 2 of a conveyance means which is rotated in the arrowed direction by a driving source, not shown in the drawing; during that time, a red light source recording head 3R, a green light source recording head 3G, and a blue light source recording head 3B in which a plurality of light emitting elements are arranged in an array or a plurality of arrays, are respectively driven and controlled by a line division control section 5 and the control apparatus 1 according to image data; these heads repeat line-shaped dot image exposure for respective colors as described below, and record a color image on the printing paper P.

The control apparatus 1 compensates for light emitting characteristics of recording heads 3R, 3G and 3B, according to correction data previously set in a compensation memory 4 in order to compensate for fluctuations of each light emitting element of recording heads 3R, 3G and 3B. The correction data is stored in compensation memory 4 as a look-up table, and correction data corresponding to each emitting element is outputted.

A line division control section 5 reassembles image data for division exposure, which will be described later, and transfers it to the control apparatus 1 as division exposure data.

The red light source recording head 3R, green light source recording head 3G and blue light source recording head 3B are array light sources which are mounted opposed to a supporting drum 2 in such a manner that light emitting elements are arranged parallel to a generating line of the supporting drum 2. An LED array is used for the red light source recording head 3R. For the green light source recording head 3G and the blue light source recording head 3b, vacuum fluorescent print heads (VFPH) are used, in which a zinc oxide fluorescent body (ZnO:Z) having light emitting characteristics in the range of blue-green is used, and which are respectively provided with a green color separation filter and a blue color separation filter.

The recording pixel density of the recording heads is 300 dpi. A Selfoc lens array is used as an image forming optical system for each recording head. In this connection, it is preferable that a yellow filter is used as a filter for the green light source, instead of a green filter, because light can be more effectively used when a color photographic printing paper is used.

A sheet of printing paper P, passed through an image exposure station in a position in which recording heads 3R to 3B are parallely arranged, is conveyed to a developing process, not shown in the drawing, by the supporting drum 2, and an output color image can be obtained there by a predetermined development processing.

Figure 2:
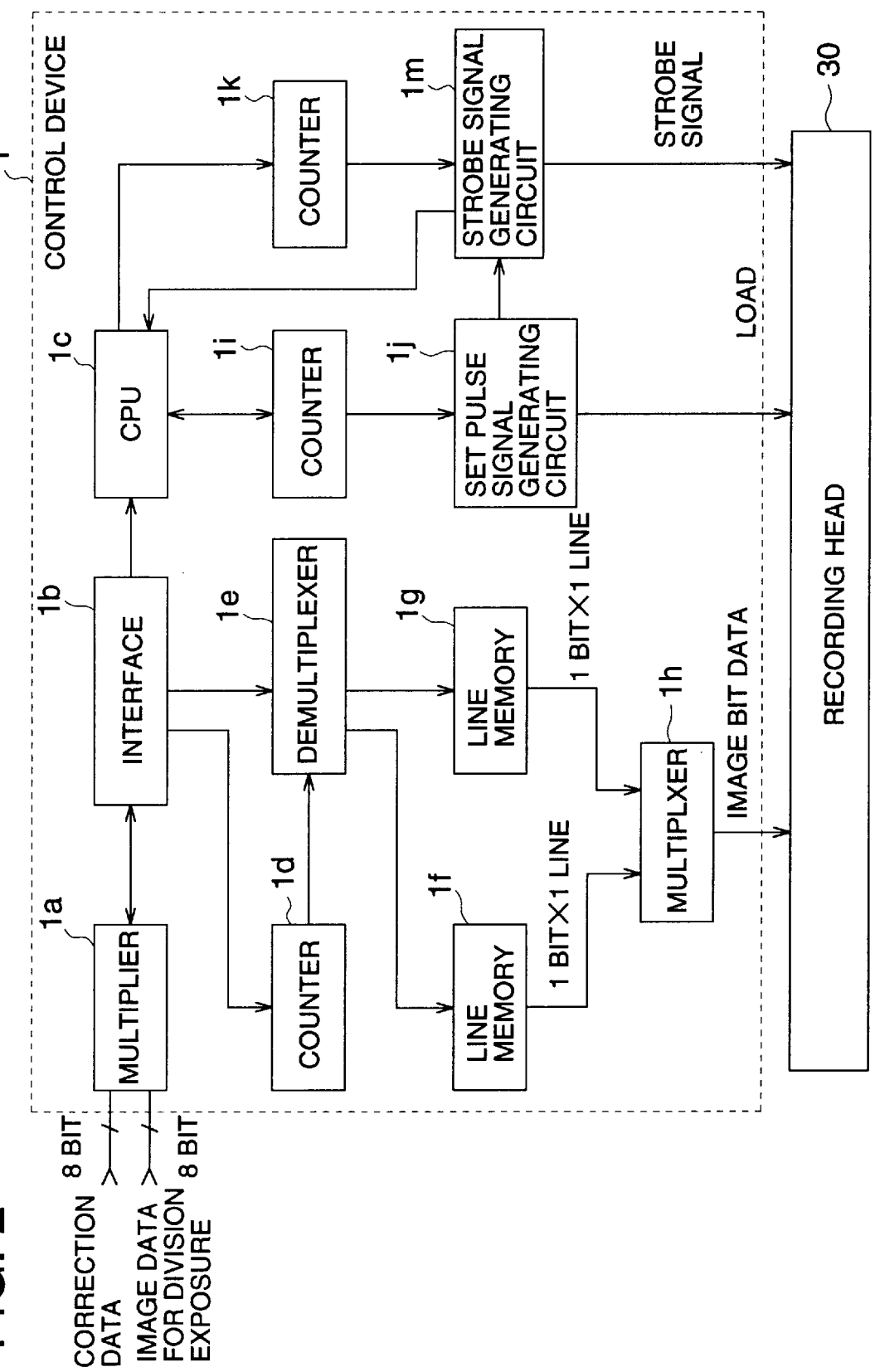
FIG. 2 is a block diagram showing a recording head driving control system of a control device.

FIG. 2 is a block diagram related to a recording head driving control of the control apparatus 1. Referring to FIG. 2, operation control functions of the recording heads 3R to 3B in the control apparatus 1 will be described below.

Figure 4:
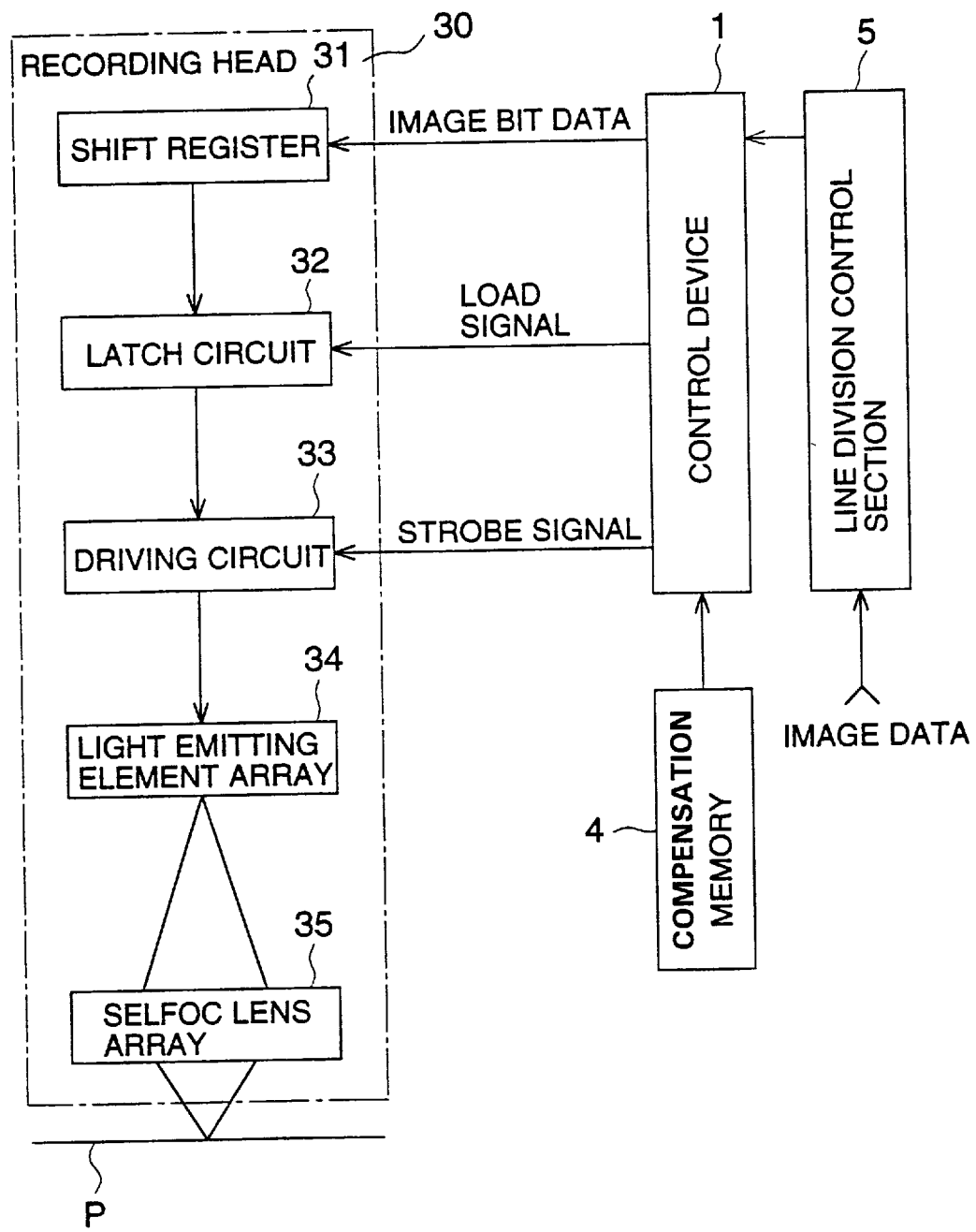
FIG. 4 is a block diagram to control image data writing operations of the recording head.

Incidentally, because each of the recording heads 3R to 3B is operated by the same control, the control of only one recording head will be described. Accordingly, in the drawings other than FIG. 1, that is, in FIG. 2, or FIG. 4 which shows a block diagram to control an image data writing operation of the recording head, FIG. 5 which is a stylized circuit diagram showing an example in which light emitting elements, arrayed in a row, of the recording heads are divided into 3 groups, and in FIG. 6 which is a stylized circuit diagram showing an example in which light emitting elements, arrayed in 3 rows, of the recording heads are divided into 3 groups, the recording heads 3R to 3B are collectively expressed by a recording head 30.

In order to compensate for image data corresponding to light emitting characteristics of the light emitting elements, correction data from the compensation memory 4 and image data for division exposure from a line division control section 5 are, initially, read in a multiplication unit 1a, and multiplied, and thereby, image data, in which fluctuation of each light emitting element is corrected for, is sent to an interface 1b. A CPU 1c sets an initial counting value to count pixels for 1 line, in a counter 1d through an interface 1b, starts the counter 1d, and controls a demultiplexer 1e for input exchange. The counter 1d starts counting and outputs the counted value to the demultiplexer 1e. The demultiplexer 1e changes image data of each pixel for every image data for 8 bits×1 line according to the inputted counted value, and writes it in a line memory 1f and a line memory 1g through the interface 1b.

When the image data in the 1st line has been written in the line memory 1f, image bit data for 1 line in the 1st line is successively outputted from the most significant bit (MSB)

of the data to the least significant bit (LSB) of the data, from the line memory 1f to the multiplexer 1h, and is transferred to the recording head 30. On the other hand, the output path of image data in the 2nd line is changed from the demultiplexer 1e, and the image data is written in the line memory 1g. Herein, image bit data means the data composed of only specific bits in the image data. In this manner, while image bit data of the line previously written in one line memory is transferred to the recording head 30, image data of the next line is written in the other line memory, and this is repeated, thereby, image data for each line can be continuously outputted, without being delayed on the basis of time.

A counter 1i counts the transferring time of the image bit data to the multiplexer 1h under the control of the CPU 1c, and outputs the counted signals to a load signal generating circuit 1j. Due to that, the reset pulse signal generating circuit 1j successively outputs load signals and outputs them to the recording head 30, at the time when image bit data for 1 line has successively been transferred from its MSB to LSB to the recording head 30. In addition to that, it also outputs the load signal to a strobe-signal generating circuit 1m.

Further, a counter 1k counts strobe-time allotted to each bit of 8 bits of image data, under the control of the CPU 1c, and outputs it to the strobe signal generating circuit 1m. Due to this, the strobe signal generation circuit 1m successively generates strobe signals having strobe time respectively corresponding to each bit of 8 bits of image data from MSB to LSB, and outputs them to the recording head 30 whenever the strobe signal generation circuit 1m receives the load signal from the load signal generating circuit 1j, and also outputs the signal to the CPU 1c. The CPU 1c which received these signals, controls the counter 1i in order to generate the next load signal.

Figure 3:
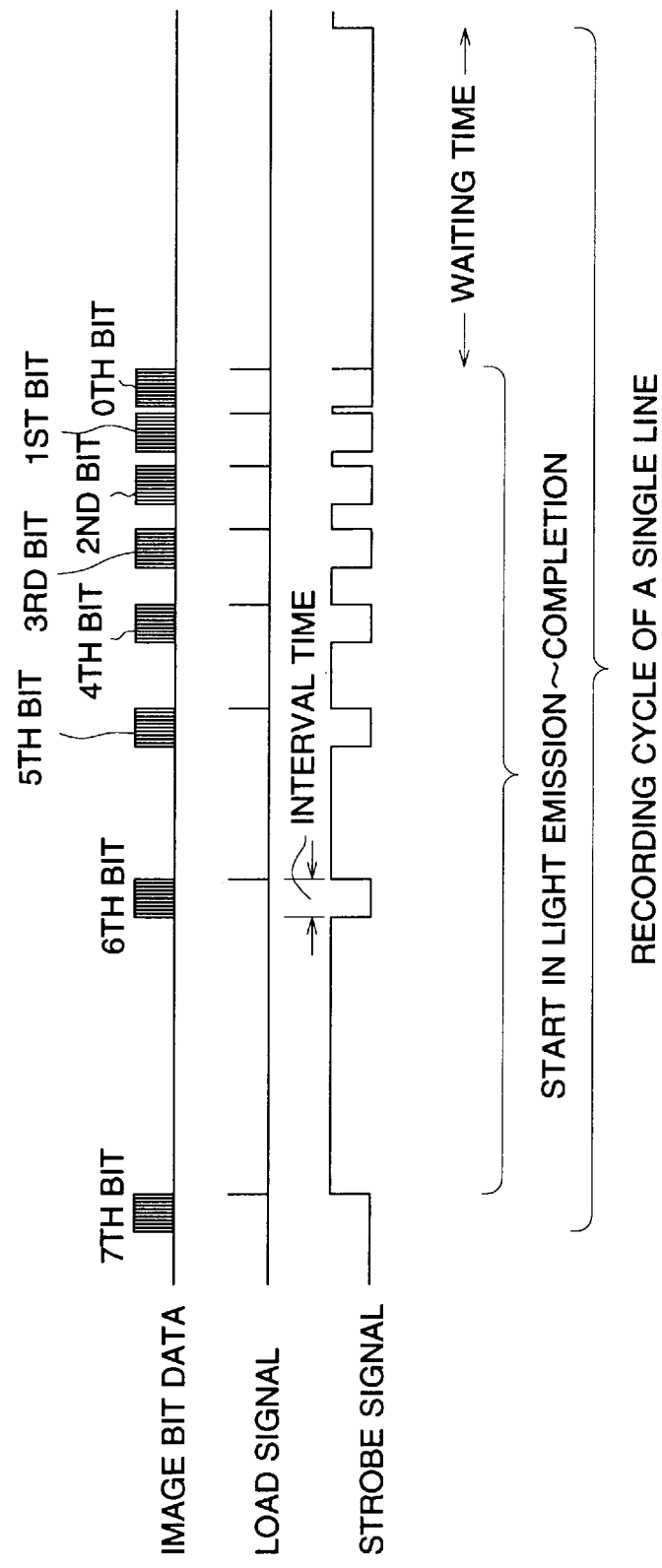
FIG. 3 is a timing chart of an output signal from the control device to the recording head.

FIG. 3 is a timing chart of the output signal from the control apparatus 1 to the recording head 30. When the control apparatus 1 repeats a series of operations described above, the load signal, strobe signal and image data are timed to each other as shown in FIG. 3, and are outputted to the recording head 30.

In image data, initially, MSB is outputted for 1 line as image bit data, and transferred to the recording head 30, and after that, the load signal and the strobe signal are outputted and exposed. In this case, a period of time during which the strobe signal exists, that is, exposure time is 40 ms, which is previously allotted to the MSB. Next, when the second bit is outputted for 1 line, the period of the strobe signal is 20 ms, and hereinafter, in the same manner, 10.2 ms for the third bit, 5.4 ms for the 4th bit, 3 ms for the 5th bit, 1.8 ms for the 6th bit, 1.2 ms for the 7th bit, and 0.9 ms for the LSB.

When one light emitting element is emitted under the condition that the latch data, that is, the bit value is "1", corresponding to all strobe signals from the MSB through the LSB, pixels formed by the emitting show the maximum density of a 225 gradation density. When the latch data is "0" corresponding to all strobe signals from the MSB through the LSB, pixels formed by this show the minimum density without being practically exposed. As described above, when the time width, corresponding to the weight of each digit of 8 bits expressing the density value, is appropriately combined, and the recording element is individually ON•OFF recording-driven, an approximately continuous gradation can be expressed.

In the above example, fluctuations of an amount of emitting light of each light emitting element of the recording head 30 are corrected by a method of multiplication of correction data and image data, however, the present invention is not limited to that, and the fluctuations may be corrected by an addition method, including a minus addition. In this connection, an example is shown in which bit-processing is carried out in the order from the MSB to the LSB, however, this order of bits is not limited to the above, and for example, the order from the LSB to MSB, or other orders, may be adopted.

Figure 10:
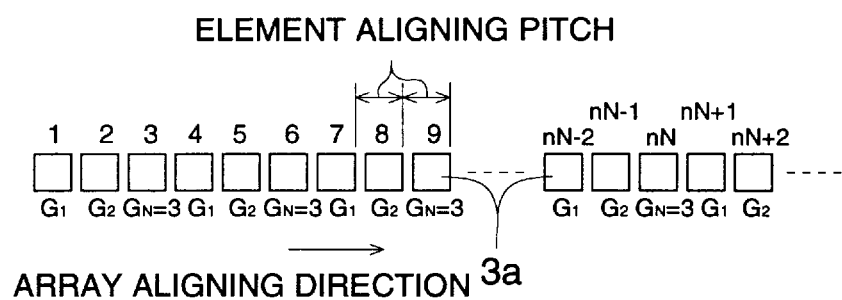
FIGS. 10(a) and 10(b) are views of an arrangement of the recording elements of an array-shaped recording head, showing an example in which recording elements are divided into 3 groups and ex re-controlled.
Figure 10:
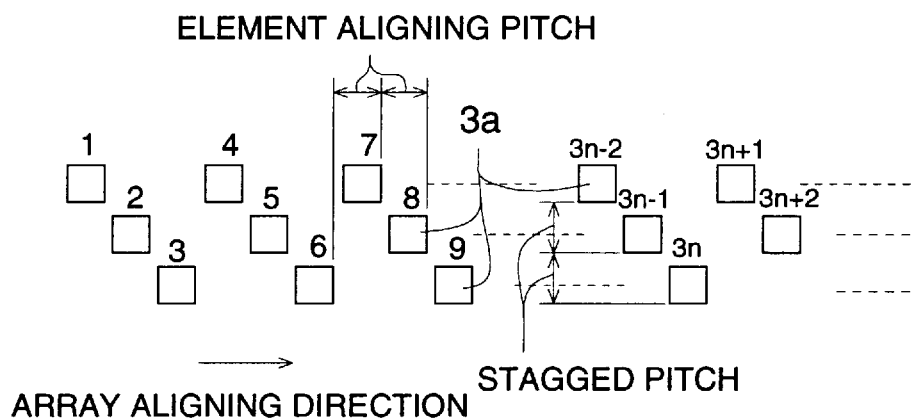

In the recording element group composed of a plurality of recording elements arranged array-like in one or plural rows, as an specific example of the exposure means in which an exposure time period of each recording element does not overlap that of the recording element adjoining in the array-like arrangement direction, a method in which an image is recorded by the N division exposure control, will be described below, referring to FIG. 1. Herein, each recording head will be described in an example in which recording elements are arranged in one row as shown in FIG. 10 (a). The control will be described according to an example of image data for one color.

Herein, in order to clearly explain, as shown in FIG. 10(a), recording elements in the array-like arrangement direction are successively numbered in order, from the end of the recording elements, and classified into N groups, that is, a group of elements $G_1$, in which the remainder is 1 in the remainder system of the number N; a group of elements $G_2$, having a remainder of 2; . . . , a group of elements $G_{N-1}$, having a remainder of N−1; and a group of elements GN, having a remainder of 0. The N division exposure means a exposure method in which exposure time periods of the above N groups do not overlap each other in the exposure of the lines in the array-like arrangement direction.

Figure 5:
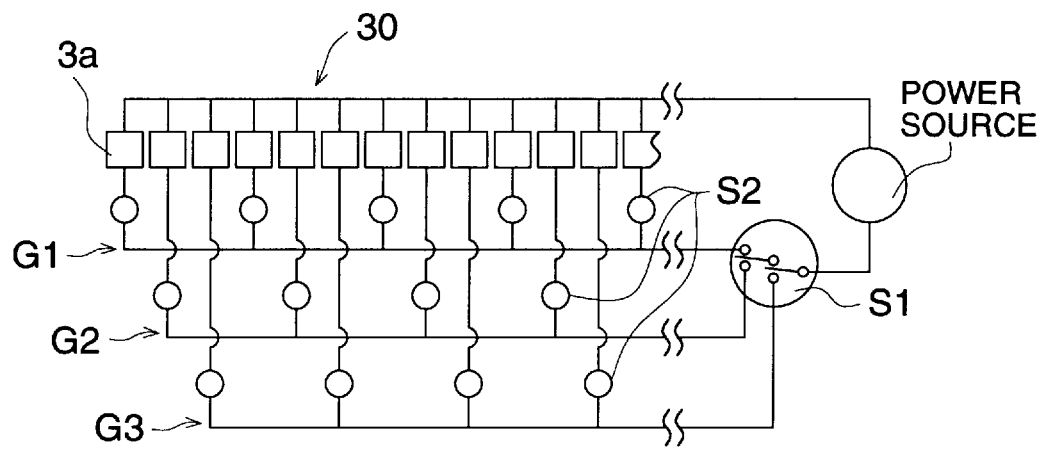
FIG. 5 is a stylized circuit diagram showing an example in which an array of light emitting elements of the recording head are divided into 3 groups.

Incidentally, FIG. 5 and FIG. 10(a) show an example of a 3 division exposure. When the value of data sent to the array is 0, the control system is set so that the array emits practically no light.

Initially, a line division control section 5 transfers image data to the control apparatus 1 as division exposure image data in which pixels, except the pixels corresponding to the group $G_1$ in image data of 1 line, are set to 0. The control apparatus 1 controls the exposure time corresponding to the transferred image data and exposure is carried out. As a result, the image is exposed in only pixels corresponding to the group $G_1$. Next, the line division control section 5 transfers image data to the control apparatus 1 as division exposure image data in which pixels, except the pixels corresponding to the group $G_2$ in image data of 1 line are set to 0. The control apparatus 1 controls the exposure time corresponding to the transferred image data, and exposure is carried out. As a result, the image is exposed in only pixels corresponding to the group $G_2$. As described above, when recording elements of the group $G_a$ (a is an integer of 1 through N) are set at the operable condition as working elements, recording elements of the group, except the group $G_a$, are set at the inoperable condition as non working elements.

When the above operations are successively repeated from group $G_1$ to group $G_N$, exposure for each pixel by all recording elements in 1 line, is completed. The above operations are carried out within the time period allotted to 1 line, and exposure of 1 line is completed. For example, when exposure is carried out on a sheet of printing paper, conveyed at a speed of 30 mm/sec, with a pixel density of 300 dpi, the time period allotted for 1 line is 2.82 msec.

By repeating the above operations for a plurality of lines corresponding to image data, an image can be recorded on a predetermined area on the printing paper.

An explanation for an image for 1 color has been described above, and the line division control section 5 and the control apparatus 1 control the same operations as in the above description, for recording heads 3R, 3G and 3B corresponding to each color image data, and image exposure is thus carried out.

That is, by the control of the control apparatus 1, exposure is conducted by the recording head 3G on lines on the printing paper P exposed by the recording head 3R according to image data of the corresponding line. Further, the exposure control is carried out, in timed relationship with the conveyance of the printing paper P and the exposure, so that exposure is conducted by the recording head 3B on the same line, in the same manner as described above, and thereby, a color image is recorded. In this connection, although the above description shows an example in which the conveyance speed of photosensitive material is constant, the present invention is not limited to that, and a system in which the conveyance speed is changed, for example, a system in which the conveyance is stopped for each line and exposure is carried out, may be used.

Figure 6:
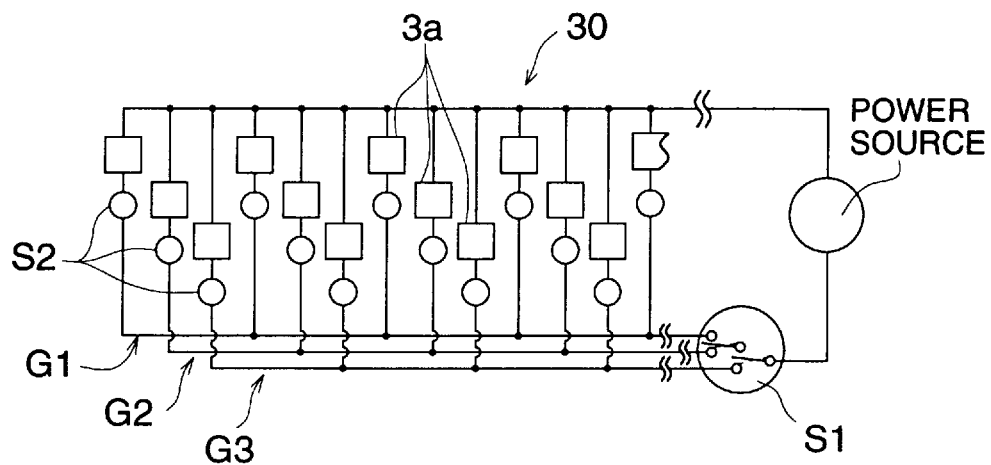
FIG. 6 is a stylized circuit diagram showing an example in which 3 arrays of light emitting elements of the recording head are divided into 3 groups.

Further, in the case where the recording elements are arranged zigzag in a plurality of rows as shown in FIG. 6 and FIG. 10 (*b*), or also in the case where one row or zigzag arrangements are arranged in a plurality of rows, when the line division control section 5 controls in the same manner after a combination of line data has been appropriately changed, the same effects can be attained if the image is recorded by the N division exposure. For example, in the case where exposure is conducted at, for example, 300 dpi, if the arrangement pitch and row pitch of zigzag arrangement of the recording element 4 are equal to the pixel pitch of 300 dpi in FIG. 10 (*b*), when pixels having the number of elements denoted by numerals 1, 4, 7, . . . , are exposed according to the data in the N-th line, the pixels 2, 5, 8, . . . , are exposed according to the data in the (N+1)th line of the image data. The pixels 3, 6, 9, . . . , are exposed according to the data in the (N+2)th line of the image data. In this manner, a combination of data is previously changed as follows, such as, the first pixel in the N-th line, the second pixel in the (N+1)th line, the third pixel in the (N+2)th line, the fourth pixel in the N-th line, the fifth pixel in the (N+1)th line, the sixth pixel in the (N+2)th line, the seventh pixel in the N-th line, . . . , and data for new one line is formed. As described above, the N-division exposure control may be conducted on this new one line data.

Although an example of the recording pixel density of 300 dpi has been shown above, the present invention is not limited to this. The higher the recording pixel density is, the smaller the interval between recording pixels is. Due to this, effects of the improvement of "step up/down" in gradation according to the present invention become great. Specifically, at more than 200 dpi, the effect of improvement is greater, which is preferable.

As described above, the N-division exposure control is a simple exposure control method in which the exposure control section becomes rather simple, and in which it is possible that the exposure time period of the recording elements, adjoining in the arrangement direction of the array, do not overlap each other, which is preferable. Further, also in the N-division exposure control method, the present invention is not limited to this method, but the following method may also be applied: for example, as shown in FIGS. 5 and 6, the wiring structure is divided for each group in the array light source itself; and exposure for each group is controlled by switch circuits S1 and S2, conceptually shown in the drawing, or similar devices. Furthermore, the exposure control method, structured such that the exposure time periods of recording elements adjoining in the arrangement direction of the array do not overlap each other, is not limited to the N-division exposure method. For example, even though the correspondence of the recording elements to each group is not regular as in the above example, an exposure control may be accepted in which the exposure time periods of recording elements adjoining in the arrangement direction of the array do not overlap each other.

A combination of an LED array which emits red light, and a Selfoc lens array as an image forming optical system, is adopted in the red light source recording head 3R. For the green light source recording head 3G and the blue light source recording head 3B, a recording head is respectively adopted in which a green filter and a blue filter for color separation are respectively combined with a VFPH, which is composed of a combination of a vacuum fluorescent tube array having light emitting characteristics in the blue-green range, with a Selfoc lens array as an image forming optical system. However, without being limited to this, a combination of a VFPH and a red filter may be used for the red light source recording head 3R, and a combination of an LED array and a Selfoc lens array may be used for the green light source recording head 3G and the blue light source recording head 3B. Further, a light emitting body+a shutter array (a liquid crystal shutter array, PLZT shutter array, or the like), a laser array in which lasers are arranged, (an LD laser array, or the like) may be appropriately combined and used. Further, for an image forming optical system, it is not limited to the Selfoc lens, but a roof mirror lens array, or similar lenses, may also be used. Still further, a recording head may be used for only one color for monochromatic image recording.

Still further specifically, when a fluorescent display tube array is used as the light source, and the ratio of an anode voltage to a grid voltage is controlled within a range lower than 0.9, the interaction between recording elements becomes small at the time of light emission, thereby, the effect of improvement of "step up/down" in gradation according to the present invention is greater, and when the ratio of voltage is more than 0.3, the amount of light is not insufficient, and accordingly, it is most preferable that the ratio is higher than 0.3 and lower than 0.9.

In this connection, in the present example, the strobe signal is set corresponding to the weight of each digit when image data is expressed by binary, using a light source controlled by the binary control of ON and OFF, or alternately, a light source, controlled by multi-value control, is used, and the strobe signal may be set corresponding to the controlled light source. For example, it may be a method in which each recording element controls 256 gradations, when a strobe signal for double exposure is set using a controllable light source having 16 levels (4 bits). Further, a light source, which can change not only light emitting time but also light emission brightness, is used as a light source controlled by a multi-value control, and thus an appropriate strobe signal may be set.

Further, although an example of 8 bits is shown as image data, the present invention is not limited to the example, but image data having any number of bits, such as 10 bits or 12 bits, may be used, and an appropriate strobe signal may be set.

Further, as the photosensitive material, a photosensitive material for monochromatic photography, or cut paper sheets may be used. Still further, effects of the invention can be attained by also using the following material: as silver halide photosensitive materials, printing paper composed of a transparent or translucent supporting body, negative film, reversal film, positive paper, instantaneous photosensitive material having self processing solution, a color material transfer system thermal development photosensitive material, or the like; and for the material other than silver halide photosensitive material, cy color film, electrophotographic system photosensitive material, or similar materials. Yet further, the same effects can also be attained in the recording system using other than light, such as a thermal system in which a thermal head is used as the recording head; the transferred amount of the color material is controlled by heat, or coloring in a micro-capsule included in the recording paper is controlled, or the like.

Accordingly, the printing paper P is not limited to color photographic paper, but monochromatic photographic paper may also be used. Specifically, when a colored silver halide photosensitive material is used, a large problem occurs in which there is a difference between sharpness in the direction of array, and that in the direction perpendicular to the array. Accordingly, the effect of improvement by the present invention is large, which is preferable. Further, the printing paper P is not limited to a roll-like printing paper, but may be a cut-printing paper. Further, concerning also a color or monochromatic photographic film without being limited to printing paper, there is a large problem in difference between sharpness in the array direction and that in the direction perpendicular to the array direction especially for material having a reflective supporting body, and therefore, the effect of improvement by the present invention is relatively increased, which is preferable.

Further, in the case of colored silver chloride paper in which a silver halide emulsion layer having more than 90 mol% of silver chloride including ratio, by which high speed development can be achieved, is provided on a reflective supporting body as a silver halide photosensitive material, a problem of difference of sharpness between an image in the direction of array and that in the direction perpendicular to the direction of array becomes largest especially in conventional image recording apparatus. Accordingly, when colored silver chloride paper is used in the image recording apparatus of the present invention, the effect of the improvement for the above problem becomes largest, which is most preferable.

In the case of use of the silver halide photosensitive material, the effect of the improvement of "step up/down" in gradation according to the present invention is greater, which is preferable. More specifically, in the case of color silver halide photosensitive material, the effect of the improvement of "step up/down" in gradation according to the present invention is much greater, which is more preferable. Furthermore specifically, in a so-called silver chloride photosensitive material, which has a silver halide emulsion layer more than the silver chloride including ratio of 90 mol % in the color silver halide photosensitive material, the effect of the improvement of "step up/down" in gradation according to the present invention is greater, which is still more preferable.

Still more specifically, when silver halide photosensitive material having a reflection supporting body is used, the effect of improvement of "step up/down" in gradation according to the present invention is greater, which is more preferable. Specifically, in so-called silver chloride paper which has a silver halide emulsion layer having a silver chloride including ratio of more than 90% in a color silver halide photosensitive material, and has a reflection supporting body, the effect of improvement according to the present invention is largest, which is most preferable.

A recording medium conveyance means for a printing paper sheet P, or the like, is not limited to the supporting drum 2 shown in FIG. 1, but may be a system in which the recording medium is conveyed on the plane, a printing paper sheet is fixed and the recording head is moved, or a recording paper sheet P and the recording head 30 are moved together. Further, the shape of the recording medium is not limited to the roll-shape, but may be sheet-shaped, or in the shape of a photoreceptor drum, and a conveyance means corresponding to their shape may be used.

Specific examples will be described below.

EXAMPLE 1-1

As the red light source recording head 3R, an array recording head is used in which a red light emitting LED array in which the pixel density of one row is 300 dpi, and a Selfoc lens array are combined; and the 2 division exposure control is carried out. For the green light source recording head 3G and the blue light source recording head 3B, an array recording head, in which a green filter and a blue filter for color separation are respectively combined with a VFPH, composed in combination of a vacuum fluorescent tube array in which the recording density of one row is 300 dpi, with a Selfoc lens array, is used without the division exposure control. A printing paper sheet P, which is a color silver halide photosensitive material composed of a silver halide emulsion layer having a silver chloride including ratio of more than 90 mol %, is pulse-conveyed at the average speed of 30 mm/sec by the supporting drum 2. After a close-up image of a subject has been printed on the printing paper P at the exposure time interval for a line-like dotted image, in which the image density in the conveyance direction is made almost equal to that in the direction of the recording element array, a recording image is obtained by development processing.

Herein, compensation for fluctuations of each light emitting element is not carried out. That is, by setting the same value (here, all 1) to the compensation memory 4 as compensation data for each element, the control, in which compensation is not carried out, is realized. In this connection, the VFPH driving voltage is made to be 40 V for both the anode and the grid.

EXAMPLE 1-2

A recording image is obtained in the same manner as in Example 1-1, except that the division exposure control is not carried out on the red light source recording head 3R, and the 2 division exposure control is carried out on the green light source recording head 3G.

EXAMPLE 1-3

A recording image is obtained in the same manner as in Example 1-1, except that the division exposure control is not carried out on the red light source recording head 3R, and the 2 division exposure control is carried out on the blue light source recording head 3G.

EXAMPLE 1-4

A recording image is obtained in the same manner as in Example 1-1, except that a 2 division exposure control is carried out on the green light source recording head 3G, and also on the blue light recording head 3B.

EXAMPLE 1-5

A recording image is obtained in the same manner as in Example 1-1, except that a 3 division exposure control is carried out on each of the red light source recording head 3R, green light source recording head 3G and blue light source recording head 3B.

EXAMPLE 1-6

A recording image is obtained in the same manner as in Example 1-1, except that a 4 division exposure control is carried out on each of the red light source recording head 3R, green light source recording head 3G and blue light source recording head 3B.

EXAMPLE 1-7

A recording image is obtained in the same manner as in Example 1-1, except that a 6 division exposure control is carried out on each of the red light source recording head 3R, green light source recording head 3G and blue light source recording head 3B.

Comparative Example 1-1

A recording image is obtained in the same manner as in Example 1-1, except that the division exposure control is not carried out on the red light source recording head 3R.

EXAMPLE 1-8

A recording image is obtained in the same manner as in Example 1-4, except that the pixel density of one row is 150 dpi for each of the red light source recording head 3R, the green light source recording head 3G and the blue light source recording head 3G.

EXAMPLE 1-9

A recording image is obtained in the same manner as in Example 1-4, except that the pixel density of one row is 200 dpi for each of the red light source recording head 3R, the green light source recording head 3G and the blue light source recording head 3G.

EXAMPLE 1-10

A recording image is obtained in the same manner as in Example 1-4, except that the pixel density of one row is 400 dpi for each of the red light source recording head 3R, the green light source recording head 3G and the blue light source recording head 3G.

Comparative Example 1-2

A recording image is obtained in the same manner as in Comparative Example 1-1, except that the pixel density of one row is 150 dpi for each of the red light source recording head 3R, the green light source recording head 3G and the blue light source recording head 3G.

Comparative Example 1-3

A recording image is obtained in the same manner as in Comparative Example 1-1, except that the pixel density of one row is 200 dpi for each of the red light source recording head 3R, the green light source recording head 3G and the blue light source recording head 3G.

Comparative Example

A recording image is obtained in the same manner as in Comparative Example 1-1, except that the pixel density of one row is 400 dpi for each of the red light source recording head 3R, the green light source recording head 3G and the blue light source recording head 3G.

EXAMPLE 1-11

A recording image is obtained in the same manner as in Example 1-4, except that a 3 division exposure control is carried out on the green light source recording head 3G.

EXAMPLE 1-12

A recording image is obtained in the same manner as in Example 1-4, except that a 4 division exposure control is carried out on the green light source recording had 3G.

EXAMPLE 1-13

A recording image is obtained in the same manner as in Example 1-4, except that a 6 division exposure control is carried out on the green light source recording had 3G.

EXAMPLE 1-14

A recording image is obtained in the same manner as in Example 1, except that a monochromatic silver halide photosensitive material, having color sensitivity to red, is exposed by carrying out the 2 division exposure control on the red light source recording head 3R; the other 2 color heads 3G and 3B are not emitted; and development processing for the monochromatic photosensitive material is carried out after exposing. In this connection, as an image, a monochromatic image is used in the same scene as in Example 1-1.

Comparative Example 1-5

A recording image is obtained in the same manner as in Example 1-14, except that the division exposure control is not carried out on the red light source recording head 3R.

EXAMPLE 1-15

A recording image is obtained in the same manner as in Example 1-4, except that the anode voltage of the green light source recording head 3G is 36 V.

EXAMPLE 1-16

A recording image is obtained in the same manner as in Example 1-4, except that the anode voltage of the green light source recording head 3G is 25 V.

EXAMPLE 1-17

A recording image is obtained in the same manner as in Example 1-4, except that the anode voltage of the green light source recording head 3G is 12 V.

EXAMPLE 1-18

A recording image is obtained in the same manner as in Example 1-4, except that the anode voltage of the green light source recording head 3G is 8 V.

The continuity and naturalness of gradation of the recording image in the above Examples 1 to 3 and Comparative Example 1, are relatively reviewed. The results are shown in Table 1, together with the number of divisions of the division exposure control for the recording heads 3R to 3B.

TABLE 1

|  |  | Example | | | Comparative |
|---|---|---|---|---|---|
|  |  | 1-1 | 1-2 | 1-3 | Example 1-1 |
| No. of divisions of division exposure control of the recording head | 3R | 2 | 1 | 1 | 1 |
|  | 3G | 1 | 2 | 1 | 1 |
|  | 3B | 1 | 1 | 2 | 1 |
| Review |  | G | GG | G | N |

G: good
N: no good

In the same manner, the results of Examples 1-4 to 1-7 and Comparative Example 1-1 are shown in Table 2.

TABLE 2

|  |  | Example | | | | Comparative |
|---|---|---|---|---|---|---|
|  |  | 1-4 | 1-5 | 1-6 | 1-7 | Example 1-1 |
| No. of divisions of division exposure control of the recording head | 3R | 2 | 3 | 4 | 6 | 1 |
|  | 3G | 2 | 3 | 4 | 6 | 1 |
|  | 3B | 2 | 3 | 4 | 6 | 1 |
| Review |  | G | GG | GGG | GGG | N |

G: good
N: no good

In the same manner, the results of Examples 1-4, 1-5 to 1-10, and Comparative Example 1-1 to 1-4 are shown in Table 3.

TABLE 3

|  |  | Example | | | | Comparative Example | | | |
|---|---|---|---|---|---|---|---|---|---|
|  |  | 1-8 | 1-9 | 1-4 | 1-10 | 1-2 | 1-3 | 1-1 | 1-4 |
| No. of divisions of division exposure control of the recording head | 3R | 2 | 2 | 2 | 2 | 1 | 1 | 1 | 1 |
|  | 3G | 2 | 2 | 2 | 2 | 1 | 1 | 1 | 1 |
|  | 3B | 2 | 2 | 2 | 2 | 1 | 1 | 1 | 1 |
| Density of pixel (dpi) |  | 150 | 200 | 300 | 400 | 150 | 200 | 300 | 400 |
| Review |  | G | G | G | G | N | NN | NN | NN |

G: good
N: no good

In the same manner, the results of Examples 1-4, 1-11 to 1-13, and Comparative Example 1-1 are shown in Table 4.

TABLE 4

|  |  | Example | | | | Comparative |
|---|---|---|---|---|---|---|
|  |  | 1-4 | 1-11 | 1-12 | 1-13 | Example 1-1 |
| No. of divisions of division exposure control of the recording head | 3R | 2 | 2 | 2 | 2 | 1 |
|  | 3G | 2 | 3 | 4 | 6 | 1 |
|  | 3B | 2 | 2 | 2 | 2 | 1 |
| Review |  | G | GG | GGG | GGG | N |

G: good
N: no good

In the same manner, the results of Examples 1-4, 1-14, and Comparative Example 1-1 and 1-5 are shown in Table 5.

TABLE 5

|  | Example | | Comparative Example | |
|---|---|---|---|---|
|  | 1-4 | 1-14 | 1-1 | 1-5 |
| Silver halide photosensitive material | color | mono-chromatic | color | mono-chromatic |
| Review | G | G | NN | N |

G: good
N: no good

In the same manner, the results of Examples 1-4 and 1-15 to 1-18 are shown in Table 6.

TABLE 6

|  |  | Example | | | | |
|---|---|---|---|---|---|---|
|  |  | 1-4 | 1-15 | 1-16 | 1-17 | 1-18 |
| VFPH driving voltage of 3G (V) | anode | 40 | 36 | 25 | 12 | 8 |
|  | grid | 40 | 40 | 40 | 40 | 40 |
| Voltage ratio anode/grid |  | 1.0 | 0.9 | 0.6 | 0.3 | 0.2 |
| Amount of light |  | GGG | GGG | GGG | GG | G |
| Continuity of gradation |  | G | GG | GGG | GGG | GGG |

G: good
N: no good

In this connection, "1" in the column of the number of divisions in Tables 1 to 4, shows that the number of divisions is 1, that is, there is no division exposure control. Further, G and N of the result of the review in each table are the results of the review only in that table, and the more the number of G's, the better it is, and the more the number of N's is, the worse it is, however, the result of the review is independent from that of other tables. Accordingly, for example, the grade of G in Table 1 is not always equal to that in Table 2.

From Table 1, the following can be seen: in printing on the printing paper P, when the division exposure control is carried out so that the pixel is not recorded at simultaneous emission of light of the recording elements, adjoining in the arrangement direction of the array, even when only one of the red light source recording head 3R, green light source recording head 3G, and blue light source recording head 3B, is insufficient, a natural color image, which is more excellent in continuity of gradations than in the case where the division exposure control is not carried out on all of them, can be recorded; and when the division exposure control is conducted on at least one of them, a monochromatic image, which is excellent in continuity of gradation, and is natural, can be recorded. Further, it is seen from Table 1 that, when a color image is recorded, an effect of the division exposure control on the green light source recording head 3G is greater than that of other color light source recording heads.

It can also be seen from Tables 2 and 4 that the continuity of gradation of the recording image is increased as the number of division is increased to approximately 4 divisions, however, even when the number of divisions is increased more than that, the effect is saturated. Further, it is seen in Tables that, when at least one head is divided into more than 4, the effect is greater. Further, from Table 3, it is seen that the continuity of gradation of the image is increased as the density of arrangement of light emitting elements of the recording head is increased until the density of pixels is 200 dpi, however, when the pixel density is more than 200 dpi, the effect is saturated.

Furthermore, from Table 5, it is seen that the effect of improvement of the continuity of gradation is larger in a color silver halide photosensitive material than in a monochromatic silver halide photosensitive material. In table 6, the following can be seen: an image, which has excellent continuity and is natural, is obtained as the ratio of an anode voltage to a grid voltage of VFPH is decreased; however, when the ratio is too small, the depiction in the high density portion is somewhat insufficient due to an insufficient amount of light; and a ratio of voltage of larger than 0.3 and smaller than 0.9 is a preferable range.

EXAMPLE 1-19

A recording image is obtained in the same manner as in Example 1, except that fluctuations for each recording element are compensated for in the red light source recording head 3R, by the following procedures.

1) One recording element (the i-th element) is emitted and the brightness ($E_i$) is measured by a light receiving sensor.

2) The above measurement is successively conducted for each element.

3) A compensation value ($C_i$) is calculated by a brightness ratio of the obtained brightness ($E_i$) and a standard brightness ($E_0$), and stored in a compensation memory 4.

$C_i = E_0/E_i$

4) The image data for the review is multiplied by the compensation data in a multiplying unit 1a, so that the image data is compensated for, and then the image is exposed on the printing paper P.

5) A predetermined development processing is carried out on the exposed printing paper P, and an image for the review is obtained.

Comparative Example 6

In the red light source recording head 3R, a recording image is obtained in the same manner as in Comparative Example 1-1, except that the compensation of fluctuations for each recording element is carried out by the same method as in Example 1-19.

Example 1-19 and Comparative Example 1-6 are reviewed in the same manner as in Example 1-1. As a result, Example 1-19 has a density unevenness smaller than Comparative Example 1-6, and also has no "step up/down" in gradation. Thus, a high quality image having excellent gradation continuity can be obtained.

EXAMPLE 1-20

In the red light source 3R, the recording image is obtained in the same manner as in later Example 1-21, except that the compensation is carried out by the following processes.

1) All recording elements are light-emitted according to the image data value in which a density value on the printing paper P is approximately 1.0, the printing paper P is exposed thereby and is development processed, and an image for compensation is obtained.

2) Density of the image for compensation obtained by the above operation is measured by using a density measurement device (Konica Micro-Densitometer PDM-5 Type BR, made by Konica Corporation) in the arrangement direction of the recording elements of the recording head 3R, and density data is thus obtained.

Figure 7:
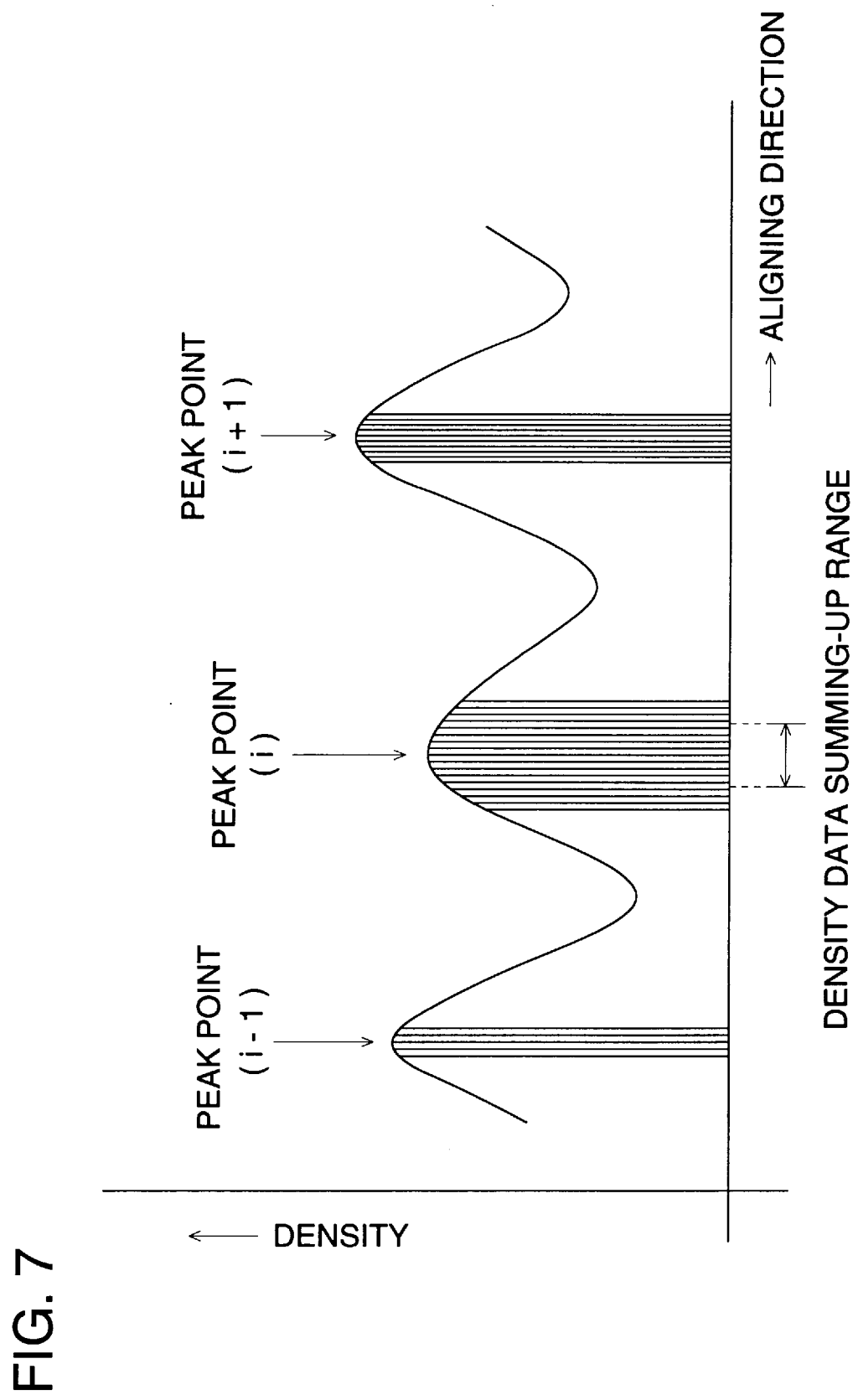
FIG. 7 is a graph showing the density, which is obtained by recording an image onto a sheet of printing paper by emitting all recording elements of the recording head at a predetermined image data value.

3) FIG. 7 shows an example of the density data obtained as described above. This data has the shape, in which the density data shows a peak with respect to a position of each recording element, and according to this, the density peak position (i) is respectively detected for all recording elements.

4) Several data positioned in front and in back of the peak position (i) obtained as above, (herein, 5 data values in the front and back), are added to peak density data, and addition density data ($D_i$) is calculated. The same operations are conducted on all recording elements.

5) Compensation data ($C_i$) is calculated by the thus obtained addition density data ($D_i$) and reference addition density ($D_0$) (an average value of all addition density), and stored in a compensation memory 4.

$C_i = D_0/D_i$

6) According to the obtained compensation data ($C_i$), an image is formed in the same manner as in Example 1-19.

EXAMPLE 1-21

In the red light source recording head 3R, a recording image is obtained in the same manner as in Example 1-19, except that the compensation is carried out by the following processes.

1) All recording elements are light-emitted according to a plurality of image data values having different density values, the printing paper is exposed, development processing is carried out, and an image for compensation is obtained.

2) Density of the image for compensation, obtained by the above operations, is measured in the same manner as in Example 1-20, and a plurality of the addition density values are obtained, in which image data is different for each recording element.

3) Concerning all recording elements, the relationship between the image data value (which is proportional to the amount of light of the recording element) and the density value is obtained; and the image data, which becomes a target specific density (for example, density of 1.0), is defined as an amount of light ($P_i$), which is calculated under the above relationship.

4) The compensation data ($C_i$) is calculated by the ratio of the obtained amount of light ($P_i$) and the reference amount of light ($P_0$) (an average value of all amount of light).

$C_i = P_0/P_i$

5) An image is formed in the same manner as in Example 1-19, according to the obtained compensation data ($C_i$).

As a result of the review for image, in Examples 1-20 and 1-21, there is no gradation in the same manner as in Example 1-19. Further, in Example 1-20, an excellent image can be obtained in which uneven density is less than in Example 1-19. Further, in Example 1-21, an excellent image can be obtained, in which uneven density is less than in Example 1-20, and in which uneven density is less specifically in fine pitches.

In Examples 1-20 and 1-21, Konica Micro-Densitometer PDM5-Type BR made by Konica Corporation, is used as a density measurement device. However, when the same review is conducted using scanners such as a commercial flat bed scanner, or a drum scanner, almost equal effects can be obtained.

In Examples 1-20 and 1-21, an average value of all recording elements is used as the reference addition density ($D_0$), and the reference amount of light ($P_0$). However, when the same review is conducted by using the maximum value or minimum value in all recording elements as the reference, approximately equal effects can be obtained.

In Examples 1-20 and 1-21, a sheet of printing paper (a paper for silver halide photographic photosensitive material) is used for a compensation image and a review image. However, as a silver halide photosensitive material, a transparent or translucent printing paper, a photosensitive material on which a visible image can be formed, such as a negative film, a reversal film, a reversal paper, a photosensitive material sensitive to wavelength of visible-infrared light, a monochromatic photosensitive material, a photosensitive material having self processing solution (an instantaneously usable photosensitive material), or similar materials, which is a photosensitive material capable for forming a visible image, may be used, and when an exposure device to expose them using a light source having an appropriate wavelength is used, the same effects can be attained.

Further, a photosensitive material for a compensation image may be different from a photosensitive material used for actual image formation, however, it is preferable that the same photosensitive material is used for the reason that compensation can be carried out including characteristics of the photosensitive material, or similar reasons.

Still further, the accuracy of compensation can also be increased when a compensation image is outputted by carrying out compensation using a compensation value obtained as necessary; and an operation for obtaining a compensation value is further repeated in the same manner.

EXAMPLE 1-22

In the red light source recording head 3R, a recording image is obtained in the same manner as in Example 1-21, except that compensation is carried out in the following steps.

1) While adjoining 2 recording elements (the i th and the i+1th recording elements) are emitted, the total brightness ($E_{i, i+1}$) of the 2 recording elements is measured by a light receiving sensor.

2) While two recording elements in every 2 recording elements (the i th and the i+2 th recording elements) are emitted, the total brightness ($E_{i, i+2}$) of the 2 recording elements is measured by a light receiving sensor.

3) Measurements in the above 1) and 2) are successively conducted on each recording element.

4) The following calculation is carried out on a measured value, and a rough calculation brightness (Ei) is obtained for each recording element.

$E_i = (E_{i-1, i} + E_{i, i+1} - E_{i-1, i+1})/2$

5) Correction data ($C_i$) is calculated according to a ratio of the brightness of the obtained brightness ($E_i$) and the reference brightness ($E_0$) (an averaged value of all brightness values), and is stored in the compensation memory 4.

$C_i = E_0/E_i$

6) An image is formed in the same manner as in Example 1-19 according to the obtained compensation data ($C_i$).

Incidentally, a sensor is used, which has a measuring area and a measuring range sufficient to measure the brightness of the 2 recording elements without decreasing the brightness.

EXAMPLE 1-23

In the red light source recording head 3R, a recording image is obtained in the same manner as in Example 1-19, except that compensation is carried out in the following steps.

1) In a chip (128 pixels in an example of the experiment) constituting an LED array, the brightness (E1(j), E2(j), E3(j), E4(j)) is measured by the light receiving sensor under the following conditions.

Herein, j is the number of elements in the chip.

E1(j) is the brightness measured while one recording element (the j th recording element) is emitted.

E2(j) is the total brightness of two adjoining recording elements (the j th and the j+1 th recording elements) measured while these two recording elements are emitted.

E3(j) is the total brightness of 3 adjoining recording elements (the j−1 th, the j th, and the j+1 th recording elements) measured while these 3 recording elements are emitted.

E4(j) is the total brightness of 4 adjoining recording elements (the j−1 th, the j th, the j+1 th, the j+2 th recording elements) measured while these 4 recording elements are emitted.

2) The above measurements are successively carried out for each recording element.

3) The brightness of one recording element (E128(j)) is obtained by calculation according to the measure values (E1(j), E2(j), E3(j), E4(j)) while all recording elements in the chip are simultaneously emitted.

The following calculations are carried out in the example of the experiment.

Changing ratios of light amount R2(j), R3(j) and R4(j) are obtained by using E1(j) as the reference.

R2(j)=(E2(j)−(E1(j)+E1(j+1)))/(E1(j)+E1(j+1))

R3(j)=(E3(j)−(E1(j−1)+E1(j)+E1(j+1)))/(E1(j−1)+E1(j)+E1(j+1))

R4(j)=(E4(j)−(E1(j−1)+E1(j)+E1(j+1)+E1(j+2)))/(E1(j−1)+E1(j)+E1(j+1)+E1(j+2))

Lowering ratios of the light amount R2(i), R3(i) and R4(i) are regression-calculated using the quadratic functions as follows.

$R2(x) = A(2) \times X^2 + B(2) \times X + C(2)$ $R3(x) = A(3) \times X^2 + B(3) \times X + C(3)$ $R4(x) = A(4) \times X^2 + B(4) \times X + C(4)$ Herein, A(2), A(3) and A(4) are obtained.

A(128) is obtained by the regression-calculation using $A(y) = d \times \ln(y) + h$ B(128) and C(128) are respectively obtained under the supposition that the changing ratio of light amount, under the condition of light emission of all recording elements in the chip, $R128(X) = A(128) \times X^2 + B(128) \times X + C(128)$, and its inclination $S128(x) = 2 \times A(128) \times X + B(128)$, respectively become 0 near the center (X=63) of the chip.

4) Using the obtained changing ratio of light amount $R128(X) = A(128) \times X^2 + B(128) \times X + C(128)$, the compensation value (C(i)) of fluctuations of the pixel of the j th element in the chip, is calculated by the following equations.

$j=1$ to 32 $C(i)=1/E1(j) \times R128(32)$ $j=33$ to 96 $C(i)=1/E1(j) \times R128(j)$ $j=97$ to 128 $C(i)=1/E1(j) \times R128(97)$ 5) By determining the above compensation value for each chip, the compensation data ($C_i$) for each recording element is calculated and stored in the compensation memory 4.

6) An image is formed in the same manner as in Example 1-19, according to the obtained compensation data ($C_i$).

Figure 8:
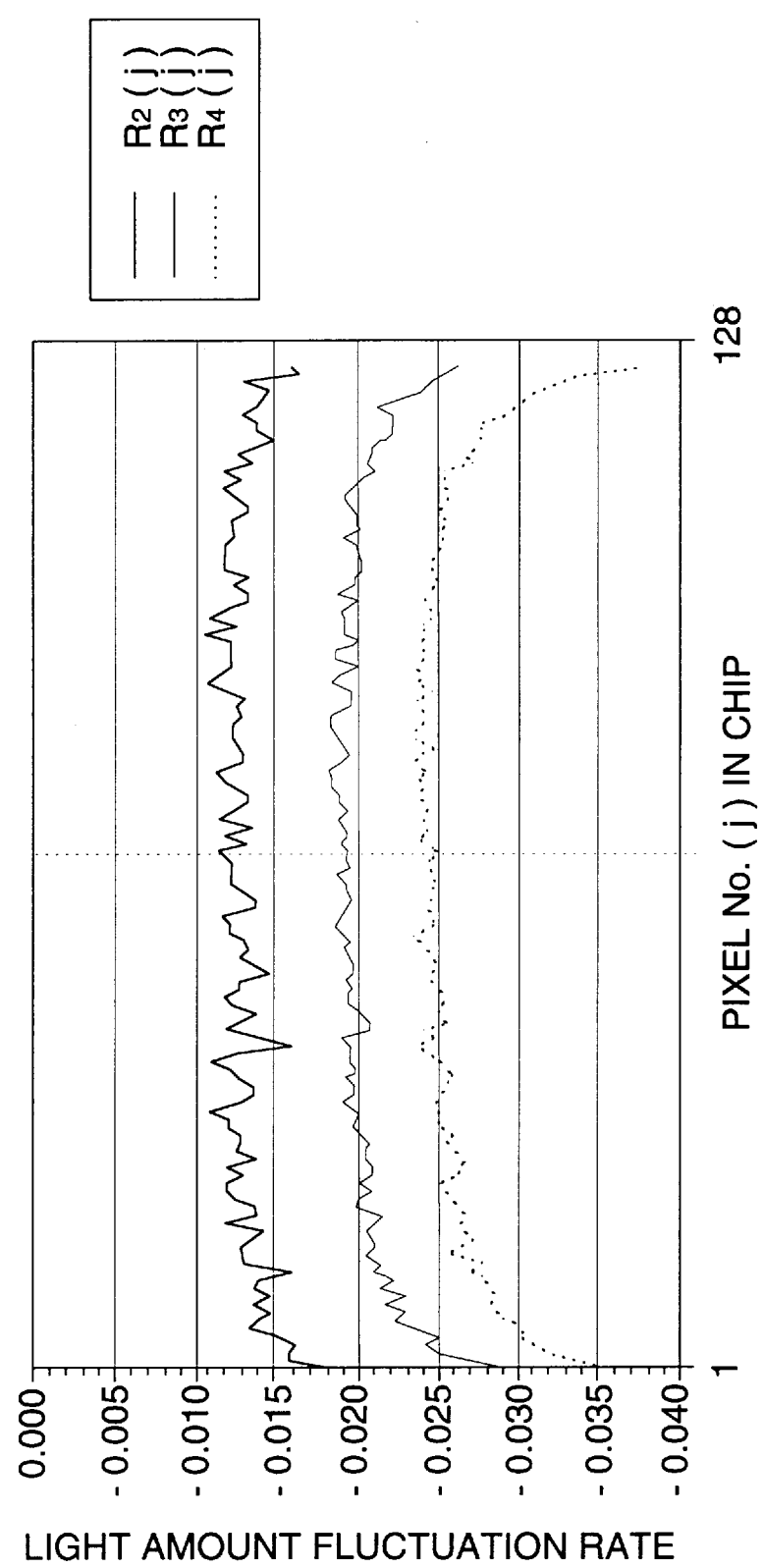
FIG. 8 is a graph of a changing ratio of the amount of emitting light depending on the number of simultaneously emitting adjoining elements of the recording elements of the recording head.

In this connection, as the sensor, a sensor is used, which has a measuring area and a measuring range sufficient to measure the brightness of 4 recording elements without decreasing the brightness. FIG. 8 shows an example of the changing ratio of the light amount according to the example of this experiment.

As a result of review of the image, Examples 1-22 and 1-23 show no "step up/down" in gradation, which is the same as Example 1-19. Further, in Example 1-22, an excellent image is obtained in which the density unevenness is less than in Example 1-19, and specifically, large unevenness is less on the whole. Still further, in Example 1-23, an excellent image can be obtained in which the density unevenness is still less than Example 1-22, and specifically, the unevenness is less in the fine pitch.

Although, in Examples 1-22 and 1-23, each recording element has been measured while one sensor is being moved along the array, the same effect can also be attained by using a plurality of sensors. Further, when a sensor array, such as a linear CCD, is used and measurement is carried out without moving the sensor, almost the same effect can be attained.

In Example 1-22, an example of simultaneous emission of the 2 recording elements has been shown, however, the number of measurements is not limited to this example. That is, when a plurality of recording elements simultaneously emit light, almost the same effects can be attained by obtaining the brightness ($E_i$) of each recording element by using an appropriate calculation operation.

Calculation methods are not limited to those in Examples 1-22 and 1-23, and when a method is used in which the brightness of one recording element can be roughly calculated by an appropriate calculation processing corresponding to characteristics of the used array light source, under the condition of simultaneous emission of a plurality of recording elements, almost the same effects can be attained. For example, in a portion which is regression-calculated by using the quadratic function or the linear function, an appropriate function may be used corresponding to characteristics of a used array light source.

EXAMPLE 1-24

In the green light source recording head 3G, a recording image is obtained in the same manner as in Example 2, except that compensation of fluctuations for each recording element is carried out by the following operations 1) Three brightness of one recording element ($E_i$) (the i th element) is measured by a light receiving sensor under the condition of light emission of all recording elements. As the light receiving sensor, a sensor is used which can effectively receive the light from one recording element to be measured, by using an aperture so that the sensor is not affected by the light from the other recording elements.

2) The above measurement is successively carried out for each recording element.

3) Compensation data ($C_i$) is calculated from the ratio of the brightness of the obtained brightness ($E_i$) and the reference brightness ($E_0$) (an average value of all brightness values), and is stored in the compensation memory 4.

$C_i = E_0/E_i$

4) The image formation is carried out by the same method as in Example 1-19, according to the obtained compensation data ($C_i$).

As a review of the image, an excellent image can be obtained in Example 1-24, in which there is no "step up/down" in gradation as in Example 1-19; the large unevenness on the whole and unevenness in fine pitch are less than in Example 1-19; and density unevenness is still less.

Although light is shielded using an aperture in Example 1-24, almost the same effects can also be attained when a measuring method, which is not affected by light from other recording elements, is used, for example, when a sensor itself having high directivity in the direction of irradiation of light from the recording element is used; light is collected by a lens; or only light from the specific recording element is conducted by using an optical fiber.

EXAMPLE 1-25

A VFPH, in which the red light source recording head 3R, green light source recording head 3G and blue light source recording head 3B are arranged, is respectively compensated for by using the method described in Example 1-20. When an image is outputted in the same manner as in Example 1-6 except that, a high quality image which has no "step up/down" in gradation and less unevenness, can be obtained.

Further, in the above case, when a natural image, such as the image used for the review, is formed, the most conspicuous effect can be attained in the case where the green light source recording head is used. Furthermore, also when compensation is carried out by appropriately using the methods described in Examples 20 to 24 as the compensation method for each recording head, the same effects can be can be attained.

In Examples 1-19 to 1-25, examples of compensation by only density measurement or brightness measurement have been described, however, compensation may be carried out in a combination of both of them.

Further, the density measurement means or the brightness measurement means may be mounted in the image forming apparatus, or compensation data may be calculated outside the apparatus without mounting these means, and then stored in the memory.

In Examples 1-19 to 1-25, a means has been used by which compensation data is obtained by using the array light source itself to be compensated. However, even when compensation data is obtained by using the same kind of array light source, and the same kind of array light source which is different from the array light source by which the compensation data has been obtained, is compensated for by using the obtained compensation data, the same effects can also be attained.

The same kind of array light source described here, shows an array light source in which characteristics of light emission is approximately similar to each other when a plurality of recording elements emit the light.

Figure 9:
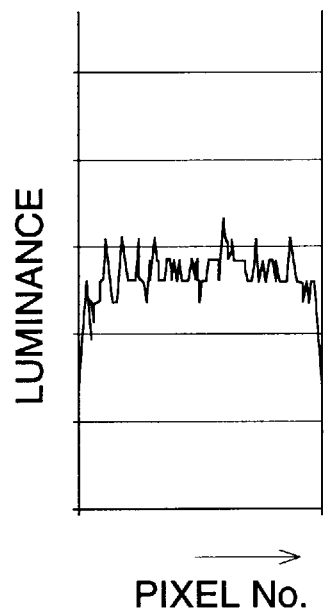
FIGS. 9(a) and 9(b) are graphs of characteristics of an array light so
Figure 9:
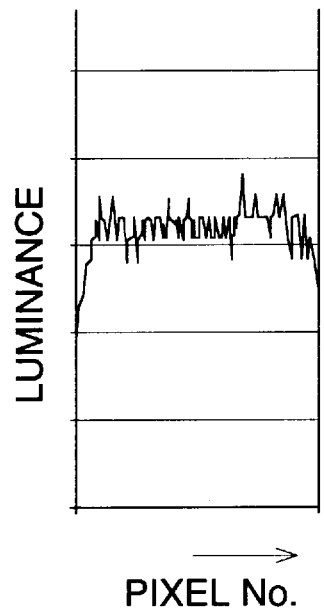

Examples (a) and (b) of the same kind of array light sources are shown in FIG. 9.

In Examples 1-19 and 1-25, compensation is carried out by multiplication of compensation data, however, the correction means is not limited to the multiplication, but even when the compensation is carried out by addition, subtraction, or division, the same effects can be attained.

Further, a specific example in which image formation has been carried out by the structure of above Example 1-25, will be shown below.

EXAMPLE 1-26

In the case of formed image 1 in which a solid image is formed which has a uniform density in a predetermined area, and has a stepped-density, in which a time period from the minimum exposure time to the maximum exposure time is divided into several steps of time, and in a case of a formed image 2 in which an image, including a close-up of a face of the subject with a gray gradation background, is formed, the maximum number of times of light emission in the plural number of times of exposure, that is, the number of gradations is shown by the number of bits in Table 7, and the time period of the strobe signal is appropriately adjusted and unified. By using an output condition 1 in which the density of an image formed in the maximum exposure time is approximately equal to the maximum density of a photosensitive material itself in the review by visual observation, and an output condition 2 in which the density unevenness is scarcely remarkable in a solid image having an intermediate density, processing from image formation through development is carried out.

Concerning the obtained image, an image, in which the maximum density is fully expressed at a portion on the formed image 1 corresponding to the step of a high exposure time period, or at a portion of a subject's hair, is shown by "A", and an image, in which the maximum density is not fully obtained, is shown by "C". Further, regarding the density unevenness, a high quality image, in which the unevenness at an intermediate density portion of the formed image 1, at a portion of a subject's skin of the formed image 2, and at a portion of the background gradation, is not remarkable, and the continuity of gradation is acceptable, is shown by "A", and an image in which the unevenness is remarkable, is shown by "C". These results of the review are shown in Table 7, together with the pertinent conditions.

TABLE 7

| Example 1–26 No. | Max. number of light emission | Number of gradation | Output condition | Max. density | Density unevenness |
| --- | --- | --- | --- | --- | --- |
| 1 | 8 | 256 | 1 | G | N |
| 2 | 8 | 256 | 2 | N | G |
| 3 | 9 | 512 | 1 | G | G |
| 4 | 9 | 512 | 2 | G | G |
| 5 | 12 | 4096 | 1 | G | G |
| 6 | 12 | 4096 | 2 | G | G |
| 7 | 16 | 65536 | 1 | G | G |
| 8 | 16 | 65536 | 2 | G | G |
| 9 | 17 | 131072 | 1 | G | G |
| 10 | 17 | 131072 | 2 | G | G |

G: good
N: no good

As can clearly be seen from Table 7, when the number of gradations is more than 512, an image forming apparatus can be provided which can form a high quality image having excellent gradation continuity, little density unevenness, and acceptable maximum density, without increasing the complexity of the apparatus nor increasing the cost.

Further, when the number of gradations is less than 65536, the time period required for processing and the required memory capacity are reduced to almost ⅔, compared to cases in which the number of gradations is more than 65536, and the necessary circuit can be simplified, resulting in an acceptable apparatus.

EXAMPLE 1-27

The light source of the binary recording element of the above described example, is replaced with a light source of a multi-valued recording element, and an image review relating to a change of the number of gradations is carried out in the same manner as in Example 1-26. The result is shown in Table 8 together with the conditions. In this connection, the multi-valued recording element in the example represents the following. For example, in the case of a 16-valued recording element, which represents a light source in which each recording element is controlled by the gradation control and the light emission time control at 16 levels (which correspond to levels expressed by 4 bits on the binary recording element), When the strobe signals for 2 time exposures are set by using this light source, control of 256 gradations, at the maximum, can be carried out.

TABLE 8

| Example 1–27 No. | Recording element | Max. number of light emission | Number of gradation | Output condition | Max. density | Density unevenness |
| --- | --- | --- | --- | --- | --- | --- |
| 1 | 4 valued | 4 | 256 | 1 | G | N |
| 2 | 4 valued | 4 | 256 | 2 | N | G |
| 3 | 4 valued | 5 | 1024 | 1 | G | G |
| 4 | 4 valued | 5 | 1024 | 2 | G | G |
| 5 | 4 valued | 8 | 65536 | 1 | G | G |
| 6 | 4 valued | 8 | 65536 | 2 | G | G |
| 7 | 4 valued | 9 | 262144 | 1 | G | G |
| 8 | 4 valued | 9 | 262144 | 2 | G | G |
| 9 | 16 valued | 2 | 256 | 1 | G | N |
| 10 | 16 valued | 2 | 256 | 2 | N | G |
| 11 | 16 valued | 3 | 4096 | 1 | G | G |
| 12 | 16 valued | 3 | 4096 | 2 | G | G |
| 13 | 16 valued | 4 | 65536 | 1 | G | G |
| 14 | 16 valued | 4 | 65536 | 2 | G | G |
| 15 | 16 valued | 5 | 1048576 | 1 | G | G |
| 16 | 16 valued | 5 | 1048576 | 2 | G | G |

G: good
N: no good

As can clearly be seen from Table 8, when the number of gradations is more than 512, an image forming apparatus can be provided, which can form a high quality image having an excellent gradation continuity, little density unevenness, and an acceptable maximum density, without increasing the complexity of the apparatus nor increasing the cost.

Further, when the number of gradations is less than 65536, a time period required for processing and the necessary memory capacity are reduced to almost ⅔, compared to the case in which the number of gradations is more than 65536, and the necessary circuit can be simplified, resulting in an acceptable apparatus.

Incidentally, the recording element in which light emission time can be controlled, was used as the multi-valued recording element in Example 1-27, however, when the multi-valued recording element in which light emission intensity can be controlled is used, an appropriate strobe signal is set, so that the image can be formed.

In Examples 1-26 and 1-27, even when exposure is carried out by using respective 3 color recording heads 3R, 3G and 3B independently, and an image is formed, almost the same effects can be obtained. In the case where each of the 3 color recording heads is used so that an natural image such as the formed image 2, is outputted, it is most effective that the green light source recording head 3G is controlled within the range of the present invention, so that an acceptable image is formed.

Almost the same effects of the present invention can be attained, without being limited to the above Examples 1-1 through 1-27, when a combination of a light source and a shutter array (a liquid crystal shutter array, a PLZT array, or the like), or a combination of laser arrays in which lasers are arranged, (an LD laser array, or the like), is used as an arrayed light source other than a combination of an LED array, a VFPH an d filters. Further, even when a silver halide photosensitive material, except for a color photographic printing paper is used, the same effects can be obtained.

As detailed above, according to the present invention, an image recording apparatus using array type recording heads can be structured so as to be simply and effectively controlled in such a manner that, at least, exposure time of recording elements adjoining in the arrangement direction of the array does not overlap any other exposure time. Thereby, an image forming apparatus can be realized, in which there is no possibility that the exposure control section is greatly complicated; the exposure light amount becomes insufficient; the "step up/down" in gradation is discontinuously generated; and in which a continuous gradation image, having little density unevenness and high quality, can be recorded, and processing speed is also increased. Accordingly, a simple, small size and low cost apparatus can be realized.

EXAMPLE 2-1

As the red light source recording head 3R, a combination of a red light emitting LED array in which the pixel density of one row is 300 dpi, and a Selfoc lens array are used; and a double division exposure control is carried out. For the green light source recording head 3G and the blue light source recording head 3B, an array recording head, in which a green filter and a blue filter for color separation are respectively combined with a VFPH, composed in combination of a vacuum fluorescent tube array in which the recording density of one row is 300 dpi, and a Selfoc lens array, is used without the division exposure control. A sheet of printing paper P, which is a color silver halide photosensitive material composed of a silver halide emulsion layer having a silver chloride including ratio of more than 90 mol %, is conveyed at a speed of 30 mm/sec by the supporting drum 2. After a natural image, including letters, has been printed on the printing paper P at the exposure time interval for a line-like dotted image, in which the pixel density in the conveyance direction is made almost equal to that in the direction of the recording element array, in two ways of a vertical direction, in which the vertical direction of the image is equal to the conveyance direction of the printing paper P, and a horizontal direction in which the same image is previously rotated by 90°, a vertical recording image and a horizontal recording image are obtained by development processing.

Comparative Example 2-1

The vertical image and the horizontal image are obtained in the same manner as in Example 1, except that the red light source recording head 3R is not division exposure-controlled.

The results in which the difference of sharpness between the vertical image and the horizontal image in the above Example 2-1 and comparative Example 2-1 are relatively reviewed respectively, is shown as review item 1, and the results in which the difference the between respective thickness of letters and lines, and density of the vertical image and the horizontal image are relatively reviewed is shown as review item 2. These items are shown in Table 9 together with the condition of the number of divisions of the division exposure control of the recording heads 3R to 3B. In the review items 1 and 2, the larger the number of "C" is, the greater the difference is. The larger the number of "A" is, the smaller the difference is, which is excellent. In this connection, "1" in the column of the number of divisions represents 1 division, that is, division exposure control is not carried out.

TABLE 9

|  |  | Example 2-1 | Comparative Example 2-1 |
|---|---|---|---|
| No. of divisions of division exposure control of the recording head | 3R | 2 | 1 |
|  | 3G | 1 | 1 |
|  | 3B | 1 | 1 |
| Review | 1 | G | N |
|  | 2 | G | N |

G: good
N: no good

Incidentally, additional test like Example 2-1 conducted for Example 1-1 was also conducted and examined for Examples 1-2 to 1-14 and Comparative Examples 1-2 to 1-4 so as to obtain the vertical image and the horizontal image. As a result, test results similar to afore-mentioned test results in Tables 1 to 4 were also obtained for Reviews 1 and 2.

Comparative Example 2-5

A vertical image and a horizontal image are obtained in the same manner as in Comparative Example 2-1, except that the printing paper P of monochromatic silver halide photosensitive material is used, and exposure is carried out by using only a red light source recording head 3R.

EXAMPLE 2-15

A vertical image and a horizontal image are obtained by the exposure control in the same manner as in Example 1-4, except that the printing paper P of colored silver halide photosensitive material composed of a silver halide emulsion layer having a silver chloride including ratio of 50 mol% is used.

Comparative Example 2-6

A vertical image and a horizontal image are obtained in the same manner as in Comparative Example 2-1, except that the printing paper P of colored silver halide photosensitive material composed of a silver halide emulsion layer having a silver chloride including ratio of 50 mol% is used.

EXAMPLE 2-16

A vertical image and a horizontal image are obtained by the exposure control in the same manner as in Example 1-4, except that silver halide photosensitive material is used in which a transparent supporting body is used instead of a reflective supporting body of the printing paper P in Example 2-1.

Comparative Example 2-7

A vertical image and a horizontal image are obtained in the same manner as in Comparative Example 2-1, except that the silver halide photosensitive material similar to that in Example 2-16 is used.

Results of the above description are shown in Tables 9-1 through 9-3.

TABLE 9-1

|  | Example | | Comparative Example | |
| --- | --- | --- | --- | --- |
|  | 1-4 | 1-14 | 2-1 | 2-5 |
| Silver halide photosensitive material | color | mono-chro-matic | color | mono-chro-matic |
| Item of     1 | G | G | NN | N |
| review       2 | G | G | NN | N |

G: good
N: no good

TABLE 9-2

|  | Example | | Comparative Example | |
| --- | --- | --- | --- | --- |
|  | 1-4 | 2-15 | 2-1 | 2-6 |
| Silver chloride inclusion ratio (mol %) of silver halide emulsion | 90 | 50 | 90 | 50 |
| Item of     1 | G | G | NN | N |
| review       2 | G | G | NN | N |

G: good
N: no good

TABLE 9-3

|  | Example | | Comparative Example | |
| --- | --- | --- | --- | --- |
|  | 1-4 | 2-16 | 2-1 | 2-7 |
| Supporting body | reflective | transparent | reflective | transparent |
| Item of     1 | G | G | NN | N |
| review       2 | G | G | NN | N |

G: good
N: no good

Incidentally, "A" and "C" of the result of the review in each table are the results of the review only in that table, and are independent of those of other tables. Accordingly, for example, the grade of "A" in Table 1 is not always equal to the grade of "A" in Table 2.

The following can clearly be seen from FIG. 9: in the printing operation onto the recording paper P, when at least only one of the red light source recording head 3R, the green light source recording head 3G or the blue light source recording head 3B is division exposure-controlled, such that a pixel is not recorded by simultaneous light emission of the recording element adjoining in the arrangement direction of the array, then, an excellent color image can be recorded in which the difference of sharpness is less than that in the case where all recording heads are not division exposure-controlled. Further, also in the case where a monochromatic image is recorded, an excellent monochromatic image in which the difference of sharpness is less, can be recorded when the recording head is division exposure-controlled. Still further, it can be seen from Table 9 that, when a color image is recorded, the division exposure control of the green light source recording head 3G is more effective than that of other color light source recording heads.

It can also be seen from Tables 2 and 4 that the difference of sharpness of the recorded image is improved as the number of divisions is increased to approximately 4 divisions, however, even when the number of divisions is increased more than that, the difference of sharpness is saturated. Further, it can be seen from Table 3 that, when at least one head is divided into more than 4, the effect is greater. Further, from Table 3, it is seen that the effect of improvement for the difference of sharpness of the image is increased as the density of arrangement of the recording element of the recording head is increased, until the density of pixels is 200 dpi, however, when the pixel density is more than 200 dpi, the effect is saturated.

Further, it can be seen that the results relating to the continuity of gradation in Tables 2 through 4 can also apply to the sharpness.

Furthermore, from Table 9-1, it is seen that the difference of sharpness of the recorded image is improved in a colored silver halide photosensitive material compared to a monochromatic silver halide photosensitive material. Still further, from Table 9-2, it can be seen that the difference of sharpness is more improved in a silver halide photosensitive material having a silver halide emulsion layer of more than 90 mol% of silver chloride including ratio than in a photosensitive material of 50 mol%. Yet further, from Table 93, it is seen that the difference of sharpness is more improved in a silver halide photosensitive material having a reflective supporting body than in a photosensitive material having a transmission supporting body.

As described above, in an image recording apparatus of the present invention, a pixel which is recorded by a recording head arranged array-like, is not formed, at least, by simultaneous light emission of a recording head adjoining in the arrangement direction of the array, and therefore, an excellent image, which has no difference of sharpness in the direction of the array nor in the direction perpendicular to that direction, can be recorded on the silver halide photosensitive material. Further, in the case where a silver halide material is a color silver halide photosensitive material, the above effects are greater. Furthermore, when a color silver halide photosensitive material, having a silver halide emulsion layer in which a silver chloride including ratio is more than 90%, is used as a silver halide photosensitive material, a more excellent image than in a conventional image recording apparatus, can be formed.

Further, when the N-division exposure control is used for eliminating the unevenness formed by simultaneous light emission of recording elements adjoining in the direction of arrangement of arrays, the apparatus can be simply structured without making the control section complicated, and cost is subsequently lowered.

Furthermore, when the number of divisions N is more than 4, the effect of improvement for the difference of the sharpness is further increased. Still further, when the density of pixels is more than 200 dpi, the above effect is still greater, which is larger than in cases in which a silver halide photosensitive material having a reflective supporting member is used.

EXAMPLE 3-1

Figure 11:
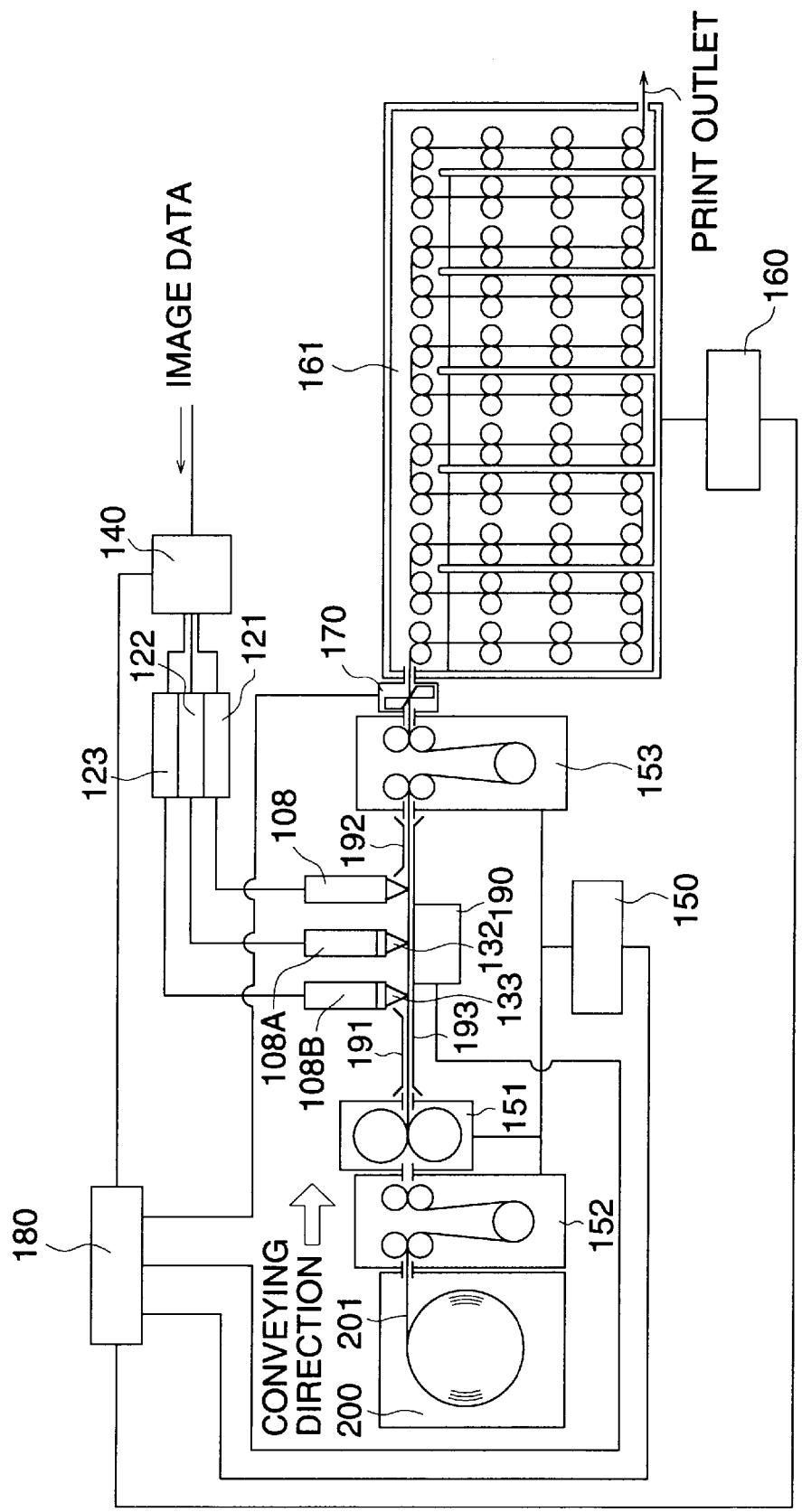
FIG. 11 is a view of the overall structure of the image recording apparatus of the present invention.

FIG. 11 shows an overall structure of image recording apparatus 1 of the invention. Image data are first inputted from the outside into an image data interface and data processing circuit 140 where the image data are subjected to image processing such as gradation change and sharpness correction based on the control of system control circuit 180, and then are sent to control circuits 121, 122 and 123 each being for each print head. Each of the control circuits 121, 122 and 123 for each print head sends control signals control signals, after being subjected to intensity correction between elements, to each of print heads 108, 108A and 108B provided with recording elements in a form of an array in one row or in plural rows, thus, the print heads 108, 108A and 108B are driven. (Print head 108 is a gallium arsenide phosphide light emitting diode print head having its center wavelength at 660 nm. Print head 108A is a zinc sulfide vacuum fluorescent tube print head having its center wavelength at 505 nm, and print head 108B is a zinc sulfide vacuum fluorescent tube print head having its center wavelength at 505 nm,) The print 108 conducts exposure for red, print head 108A is equipped with yellow gelatin filter 132, and conducts exposure for green, and print head 108B is equipped with blue gelatin filter 133, and conducts exposure for blue. On the other hand, in synchronization with exposure, precision transport roller and pulse motor unit 151 and paper supply adjusting mechanisms 152 and 163 are operated by the control of transport roller control circuit 150 based similarly on the control of system control circuit 180, and thereby, light-sensitive paper 201 is transported from paper supply magazine 200 at high speed in the arrowed transport direction shown in FIG. 11. When the light-sensitive paper 201 is once transported excessively until its end in a prescribed amount is accumulated in the paper supply adjusting mechanism 153, paper guide position control mechanism 90 causes paper guides 191, 192 and 193 to be operated so that the light-sensitive paper 201 is controlled to be at the image forming position of an optical system of print heads 108, 108A and 108B, then, is transported precisely in the direction opposite to the arrowed transport direction in FIG. 11 by the precision transport roller and pulse motor unit 151, and thus, the exposed portions are accumulated in the paper supply adjusting mechanism 152. During this precision transport, exposures for three colors are conducted simultaneously by the print heads 108, 108A and 108B. After completion of the exposure, the light-sensitive paper 201 is transported at high speed again in the arrowed transport direction shown in FIG. 11, and the exposed portion of the light-sensitive paper 201 is cut when it is at its prescribed position through operation of paper cutting unit 170. The exposed light-sensitive paper 201 which has been cut is transported to processing apparatus 161 wherein temperature and transport are controlled by processing apparatus control circuit 160, and it passes through a developing tank, a fixing tank, a first stabilizing tank, a second stabilizing tank, a third stabilizing tank and a drying section successively to be processed, and is ejected out of a print outlet.

Next, in FIG. 12, an outline of structure of a portion related to an image recording control in what is shown in FIG. 11 will be explained. Image data processed by an image data interface and a data processing circuit are inputted in print head control circuit 121 (,122 and 123) through image data transport section 103. Signals outputted from the print head control circuit 121 (,122 and 123) are inputted in the print heads 108 (,108A and 108B) as image data. To be concrete, data signals and clock signals which are image data are inputted from the print head control circuit 121 into shift register 109 in the print head 108 through signal transport section 105, load pulse signals are inputted from the print head control circuit 121 into latch circuit 110 through signal transport section 106, and strobe signals are inputted from the print head control circuit 121 into gate 111 through signal transport section 107. The print head 108 structured in aforesaid manner transmits signals to the shift register 109, latch circuit 110 and gate 111 in this order to operate recording element array 113 through driving circuit 112. (Same operations are conducted also for print head control circuits 122 and 123.)

Figure 13:
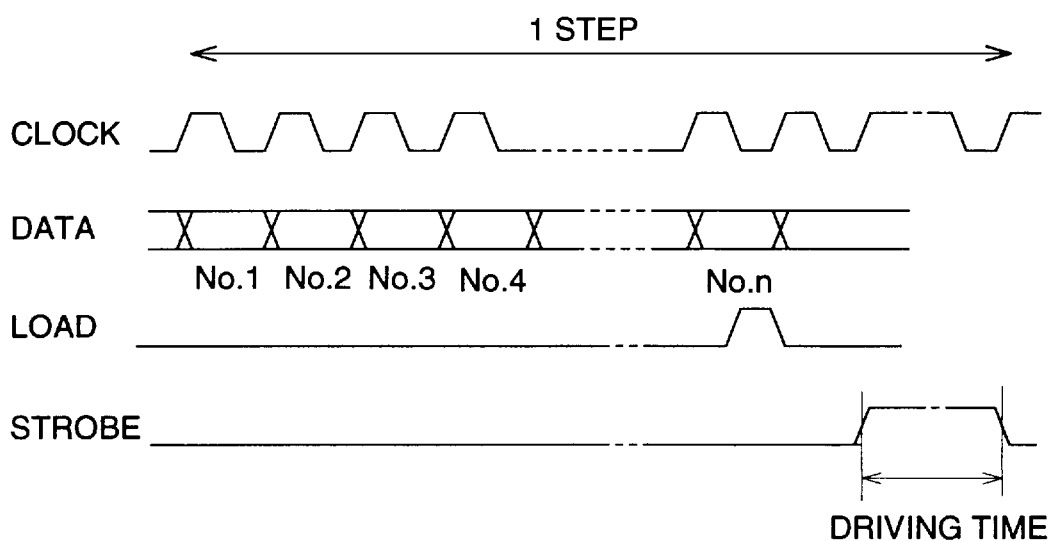
FIG. 13 is an illustration showing the data signal timing of one step in the present invention.

FIG. 13 shows data signal timing in one step of each of aforesaid clock signals, data signals, load pulse signals and strobe signals which are outputted from the print head control circuit 121. First, in synchronization with the clock signals, contents of No. 1, No. 2, No. 3 and No. 4, . . . No. N of data signals are stored in the shift register 109. Then, simultaneously with load pulse signals, all contents in the shift register 109 are stored temporarily in latch circuit 110. While the strobe signals are on the process of operation (driving time), an element in recording element array 113 with which the contents of the latch circuit 110 correspond to No. 1 among No. 1-No. N of the latch circuit 110 is driven selectively by driving circuit 112.

FIG. 14 shows how the emitting timing in the occasion where aforesaid recording element array 113 is a light emitting element such as, for example, an LED array element is controlled by data signal timing shown in FIG. 13. Light-emitting element numbers such as element No. 1, element No. 2, element No. 3, . . . are represented by the axis of ordinates, and steps 1, 2, 3, 4, . . . are represented by the axis of abscissas (time axis direction). Steps 1, 2, 3, 4, . . . of each element number are indicated by 4 types of driving modes.

Table 10 below shows, in accordance with the number of data, driving or non-driving for 4 types of driving modes shown in FIG. 16. The symbol U represents driving, V represents non-driving, and W represents the driving which is performed depending on contents of an objective bit.

In Table 10 below, when a density level in the vicinity area is smaller than boundary data 64 of density signal area, a closest driving element distance is 4, and when a density level in the vicinity area is smaller than boundary data 128 of density signal area, a closest driving element distance is 2. In this case, the closest driving element distance is a distance between two elements which are emitting simultaneously. For example, when adjoining two driving elements are not driving and an element adjoining the two driving elements is driving, the distance is 3. The boundary data of a density signal area is a minimum signal value of each density signal area when a total range for all density signal values is divided into plural density signal areas as shown in Table 10.

Aforesaid vicinity area is an area including at least several closest driving element distances, and it is a local area when viewed from the overall image, and in general, it is an area where density levels are comparatively uniform. For example, the vicinity area assumed is represented by 10–20 pixels, or by an area of 1–2 mm or less, when conducting recording of 300–400 dpi with a total image of about A4 size.

TABLE 10

| Density Area | A | B | C | D |
| --- | --- | --- | --- | --- |
| 0 to 63 | W | V | V | V |
| 64 to 127 | U | W | V | V |
| 128 to 191 | U | U | W | V |
| 192 to 255 | U | U | U | W |

U: Driving
V: Non-driving
W: Driving in accordance with contents of objective bit With regard to 4 types of driving modes A, B, C and D corresponding to aforesaid steps 1, 2, 3 and 4, its objective bit is the 5th bit, and this drives with emitting time of one step which is 32 m clock (total, 32 m×4). Incidentally, "m" is a coefficient for a unit clock pulse time. Next, with regard to driving modes A, B, C and D corresponding to aforesaid steps 5, 6, 7 and 8 shown below, its objective bit is the 4th bit, and this drives with emitting time of one step which is 16 m clock (total, 16 m×4). Next, with regard to driving corresponding to aforesaid steps 9, 10, 11 and 12 shown below, its objective bit is the 3rd bit, and this drives with emitting time of one step which is 8 m clock (total, 8 m×4). In the same manner as in the foregoing, an unillustrated objective bit is the 2nd bit, and this drives with emitting time of one step which is 4 m clock (total, 4 m×4). Further, 4 steps of each objective bit are subjected to emitting at the total of 24 steps while moving the objective bit to the 0-th bit (LSB: least significant bit), and after that, recording for one line is completed after a proper non-emitting time for adjustment of quantity of light. Incidentally, the n-th bit corresponds to a value of a digit having weight of $2^n$ among 8-bit image data.

In the present example, a vacuum fluorescent tube array is used as a recording element array, and a color photographic paper (negative paper) employing silver chloride grains is used as a light-sensitive material which is a recording medium. The number of print head elements represents n=640, and each data range is 0–255 (8-bit). Aforesaid bit-division multi-exposure system is used basically as a gradation presentation system.

Next, a signal transmission means for the vacuum fluorescent tube array shown in FIG. 5 will be explained as follows.

Figure 12:
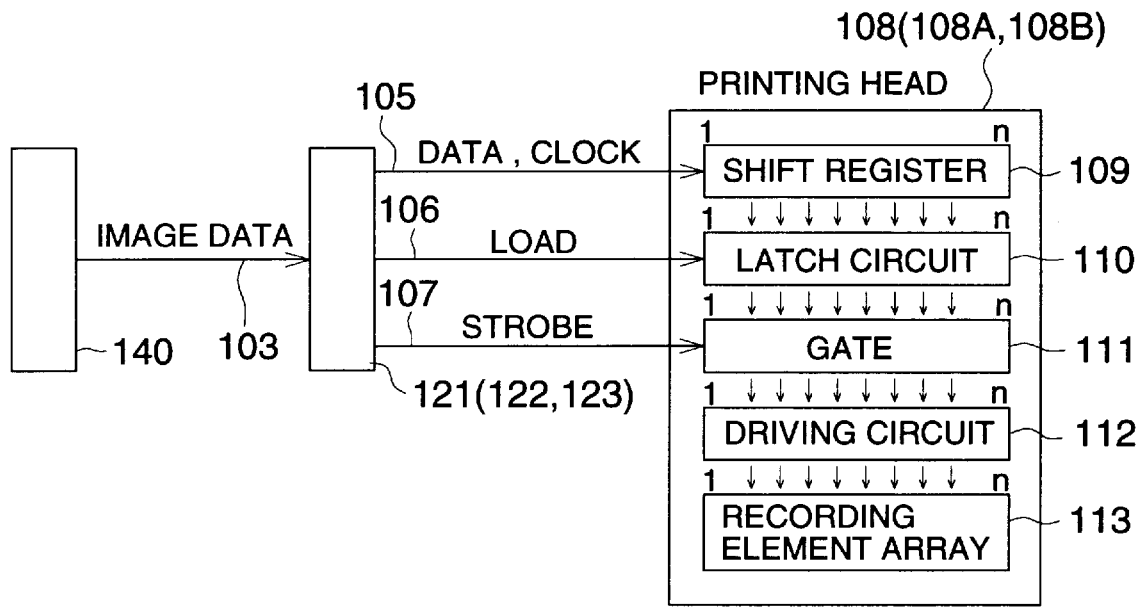
FIG. 12 is a view of the overall structure of the system which controls the print head from the image processing apparatus of the present invention.

In the same manner as in FIG. 12, while being outputted from print head control circuit 121 (122 and 123), data signals D0, D1, D2, . . . , up to D639 are transmitted at the first step in synchronization with clock signals, and thereby a load pulse is generated once, and then, strobe signal becomes active for 32 m clock after load pulse completion. Next, in the second step, D640, D641, D642, . . . , up to D1279 are transmitted, and a load pulse is generated once, and then, strobe signal becomes active for 32 m clock after load pulse completion, in the same way as in the foregoing. Next, in the third step, D1280, D1281, D1282, . . . , up to D1919 are transmitted, and a load pulse is generated once, and then, strobe signal becomes active for 32 m clock after load pulse completion, in the same way as in the foregoing. Next, in the fourth step, D1920, D1921, D1922, . . . , up to D2559 are transmitted, and a load pulse is generated once, and then, strobe signal including also data signals become active for 32 m clock after load pulse completion, in the same way as in the foregoing. The illustration has been explained above, and operations are continued to the fifth step and to the sixth step.

Next, aforesaid procedures of signal transmission will be indicated with output symbols by means of operation.

D–n[X] represents x-th bit of n-th element. It is assumed that n=0, 1, 2, 3, . . . , 639, x=7 (MSB), 6, . . . , 0 (LSB). & represents AND (logical product) and | represents OR (logical sum).

D0=D–0[7]|D–0[6]|D–0[5]
D1=D–1[7]&(D–1[6]|D–1[5])
D2=D–2[7]|(D–2[6]&D–2[5])
D3=D–3[7]&D–3[6]&D–3[5]
D4=D–4[7]|D–4[6]|D–4[5]
D5=D–5[7]&(D–5[6]|D–5[5])
D6=D–6[7]|(D–6[6]&D–6[5])
D7=D–7[7]&D–7[6]&D–7[5]

.

.

.

D636=D–636[7]|D–636[6]|D–636[5]
D637=D–637[7]&(D–637[6]|D–637[5])
D638=D–638[7]|(D–638[6]&D–638[5])
D639=D–639[7]&D–639[6]&D–638[5]
D640=D–0[7]|(D–0[6]&D–0[5])
D641=D–1[7]&D–1[6]&D–1[5]
D642=D–2[7]|D–2[6]|D–2[5]
D643=D–3[7]&(D–3[6]|D–3[5])
D644=D–4[7]|(D–4[6]&D–4[5])
D645=D–5[7]&D–5[6]&D–5[5]
D646=D–6[7]|D–6[6]|D–6[5]
D647=D–7[7]&(D–7[6]|D–7[5])

.

.

.

D1276=D–636[7]|(D–636[6]&D–636[5])
D1277=D–637[7]&D–637[6]&D–637[5]
D1278=D–638[7]|D–638[6]|D–638[5]
D1279=D–639[7]&(D–639[6]|D–639[5])
D1280=D–0[7]&(D–0[6]|D–0[5])
D1281=D–1[7]|(D–1[6]|D–1[5]
D1282=D–2[7]&D–2[6]&D–2[5]
D1283=D–3[7]|(D–3[6]&D–3[5])
D1284=D–4[7]&(D–4[6]|D–4[5])
D1285=D–5[7]|D–5[6]|D–5[5]
D1286=D–6[7]&D–6[6]&D–6[5]
D1287=D–7[7]|(D–7[6]&D–7[5])

.

.

.

D1916=D–636[7]&(D–636[6]|D–636[5])
D1917=D–637[7]|D–637[6]|D–637[5]
D1918=D–368[7]&D–638[6]&D–638[5]
D1919=D–639[7]|(D–639[6]|D–639[5])
D1920=D–0[7]&D–0[6]&D–0[5]
D1921=D–1[7]|(D–1[6]&D–1[5])
D1922=D–2[7]&(D–2[6]|D–2[5])
D1923=D–3[7]|D–3[6]|D–3[5]
D1924=D–4[7]&D–4[6]&D–4[5]
D1925=D–5[7]|(D–5[6]&D–5[5])
D1926=D–6[7]&(D–6[6]|D–6[5])
D1927=D–7[7]|D–7[6]|D–7[5]

.

.

.

D2556=D–636[7]&D–636[6]&D–636[5]
D2557=D–637[7]|(D–637[6]&D–637[5])
D2558=D–638[7]&(D–638[6]|D–638[5])
D2559=D–639[7]|D–639[6]|D–639[5]

Figure 16:
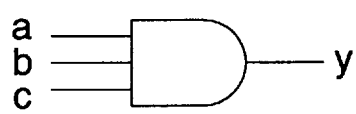
FIGS. 16(a) to 16(d) are block diagrams showing a gate circuit for calculation of the present invention.
Figure 16:
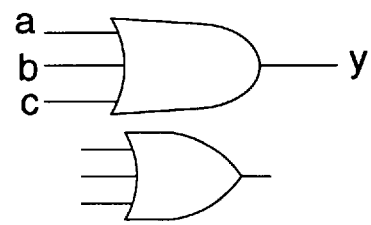
Figure 16:
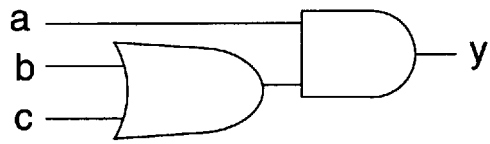
Figure 16:
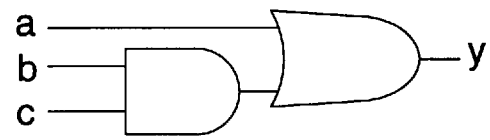

Aforesaid AND operation and OR operation are conducted by gate circuits shown in FIGS. 16 (*a*), 16 (*b*), 16 (*c*) and 16 (*d*). AND operation of y=a & b & c is conducted in FIG. 16 (*a*), OR operation of y=a|b|c is conducted in FIG. 16

(b), OR operation and AND operation for y=a & (b|c) are conducted in FIG. 16 (c), and AND operation and OR operation for y=a| (b & c) are conducted in FIG. 16 (d).

Aforesaid signal transmission is repeated for D−n[4] in place of D−n[5]. However, strobe signal is 16 m clock respectively. (for the 5th–8th step after the 4th step in FIG. 14)

The signal transmission is further repeated for D−n[3] in place of D−n[5]. However, strobe signal is 8 m clock respectively. (for the 9th–12th step)

The signal transmission is further repeated for D−n[2] in place of D−n[5]. However, strobe signal is 4 m clock respectively. (for the 13th–16th step)

The signal transmission is further repeated for D−n[1] in place of D−n[5]. However, strobe signal is 2 m clock respectively. (for the 17th–20th step)

The signal transmission is further repeated for D−n[0] in place of D−n[5]. However, strobe signal is m clock respectively. (for the 21st–24th step)

After this, there are given an emitting time period for aforesaid recording element array 113 and a non-emitting time period (waiting time).for adjustment of quantity of light. When aforesaid operations are conducted, signal transmission for one line is completed with 24 step+weight. Total clock number excluding weight and time is led to {(640+ 1)×6+32 m+16 m+8 m+4 m+2 m+m}×4=15384+252 m.

In the present example, however, 1 clock is used for transmission of data signals and load signals, and overlapping in terms of time of data signal transmission and strobe signal transmission is prevented.

Table 11 shows data, exposure time and closest light-emitting element distance.

TABLE 11

| Data | Exposure time (clock number) | Closest light-emitting element distance |
|---|---|---|
| 0 ≦ d ≦ 64 | d × m | 4 |
| 64 < d ≦ 128 | (d − 1) × m | 2 |
| 128 < d ≦ 192 | (d − 2) × m | 1 |
| 192 < d < 256 | (d − 3) × m | 1 |

(EXAMPLE 3-2)

4-division exposure system

A signal transmission means of a 4-division exposure system shown in FIG. 17 will be explained below.

Figure 15:
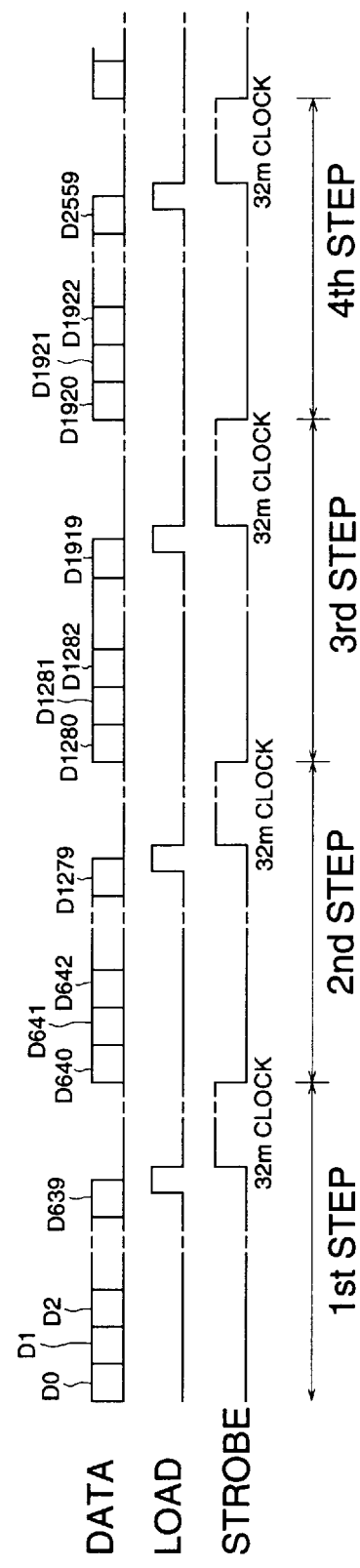
FIG. 15 is an illustration of operations of a signal sending means of a vacuum fluorescent array of the present invention.

In the same manner as in FIG. 12, while being outputted from print head control circuit 121 (122 and 123), data signals D0, D1, D2, . . . , up to D639 are transmitted in the first step in the same way as in FIG. 15, and thereby a load pulse is generated once. Then, strobe signal becomes active during 128 m clock. Next, in the second step, D640, D641, D642, . . . , up to D1279 are transmitted, and a load pulse is generated once, and then, strobe signal becomes active for 128 m clock after load pulse completion. In the third step, D1280, D1281, D1282, . . . , up to D1919 are transmitted, and a load pulse is generated once, and then, strobe signal becomes active for 128 m clock after load pulse completion, in the same way as in the foregoing. Next, in the fourth step, D1920, D1921, D1922, . . . , up to D2559 are transmitted, and a load pulse is generated once, and then, strobe signal becomes active for 128 m clock after load pulse completion, in the same way as in the foregoing. The illustration has been explained above, and operations are continued to the fifth step and to the sixth step.

Next, aforesaid procedures of signal transmission will be indicated with output symbols by means of operation.

D−n[X] represents x-th bit of n-th element. It is assumed that n=0, 1, 2, 3, . . . , 639 and x=7 (MSB).

D0=D−0[7]

D1=0

D2=0

D3=0

D4=D−4[7]

D5=0

D6=0

D7=0

.

.

.

D636=D−636[7]

D637=0

D638=0

D639=0

D640=0

D641=0

D642=D−2[7]

D643=0

D644=0

D645=0

D646=D−6[7]

D647=0

.

.

.

D1276=0

D1277=0

D1278=D−638[7]

D1279=0

D1280=0

D1281=D−1[7]

D1282=0

D1283=0

D1284=0

D1285=D−5[7]

D1286=0

D1287=0

.

.

D1916=0

D1917=0

D1918=D−637[7]

D1919=0

D1920=0

D1921=0

D1922=0

D1923=D−3[7]

D1924=0

D1925=0

D1926=0

D1927=D−7[7]

.

.

.

D2556=0
D2557=0
D2558=0
D2559=D−639[7]

Aforesaid signal transmission is repeated for D−n[6] in place of D−n[7]. However, strobe signal is 64 m clock respectively. (for the 5th–8th steps after the 4th step)

The signal transmission is further repeated for D−n[5] in place of D−n[7]. However, strobe signal is 32 m clock respectively. (for the 9th–12th steps)

The signal transmission is further repeated for D−n[4] in place of D−n[7]. However, strobe signal is 16 m clock respectively. (for the 13th–16th steps)

The signal transmission is further repeated for D−n[3] in place of D−n[7]. However, strobe signal is 8 m clock respectively. (for the 17th–20th steps)

The signal transmission is further repeated for D−n[2] in place of D−n[7]. However, strobe signal is 4 m clock respectively. (for the 21st–24th steps)

The signal transmission is further repeated for D−n[1] in place of D−n[7]. However, strobe signal is 2 m clock respectively. (for the 25th–28th steps)

The signal transmission is further repeated for D−n[0] in place of D−n[7]. However, strobe signal is m clock respectively. (for the 29th–32nd steps)

After this, there are given an emitting time period for aforesaid recording element array 13 and a non-emitting time period (waiting time) for adjustment of quantity of light. When aforesaid operations are conducted, signal transmission for one line is completed. Total clock number excluding waiting time comes to {(640+1)×8+128 m+64 m+32 m+16 m+8 m+4m+2m+m}×4=20512+1020 m.

Data, exposure time and closest light-emitting element distance in Example 3-2 are shown below.

Data 0≦d<256 Exposure time d×m Closest light-emitting element distance 4

Figure 19:
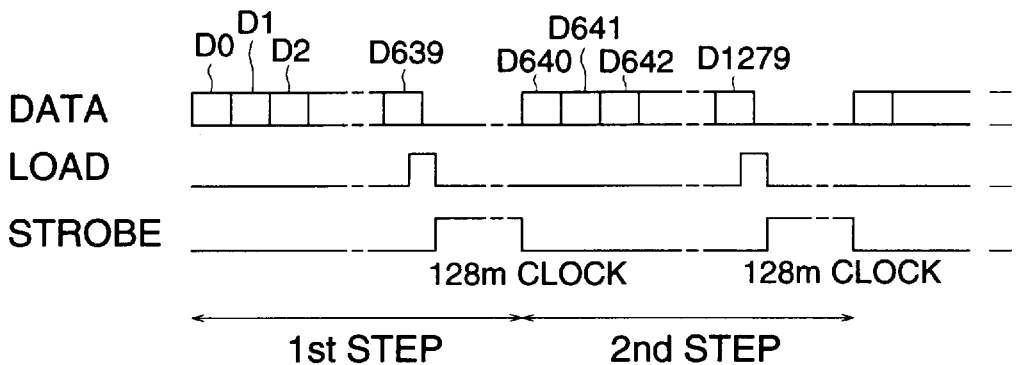
FIG. 19 is an illustration of operations showing the signal sending means of a 2-division exposure system of the present invention.

FIG. 19 shows how the emitting timing in Example 3-2 in the occasion where aforesaid recording element array 113 is a light emitting element such as, for example, an LED array is controlled by data signal timing shown in FIG. 2. With regard to light-emitting element numbers, element No. 1, element No. 2, element No. 3, . . . are represented by the axis of ordinates, and steps 1, 2, 3, 4, . . . are represented by the axis of abscissas (time axis direction). "A" represents light-emitting timing for turning on or off in accordance with objective bit at positions of steps 1, 2, 3, 4, . . . each corresponding to each element number. For example, in a range of objective 7 bits (steps 1–4), if the objective bit is 1 at the step 1 in element No. 1, the driving is conducted with "A", if the objective bit is 1 at the step 3 in element No. 2, the driving is conducted with "A", and if the objective bit is 1 at the step 2 in element No. 3, the driving is conducted with "A". Further, with regard to 6 objective bits, if each objective bit is 1 at steps 5–8, this shows that the driving is conducted with "A". Further, with regard to 5 objective bits, it is shown that the driving is conducted with "A" respectively at steps 9–12.

(EXAMPLE 3-3)

2-division exposure system

A signal transmission means of a 2-division exposure system shown in FIG. 19 will be explained below.

Figure 17:
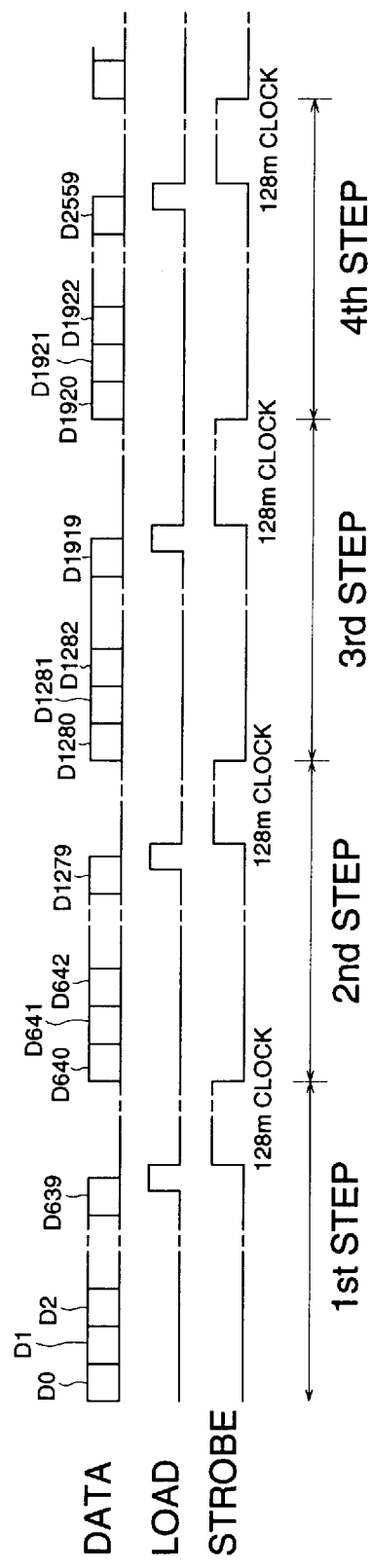
FIG. 17 is an illustration of operations of the signal sending means of a 4-division exposure system of the present invention.

In the same manner as in FIG. 12, while being outputted from print head control circuit 121 (122 and 123), data signals D0, D1, D2, . . . , up to D639 are transmitted in the first step in the same way as in FIGS. 15 and 17, and thereby a load pulse is generated once. Then, strobe signal becomes active during 128 m clock after completion of load pulse. Next, in the second step, D640, D641, D642, . . . , up to D1279 are transmitted, and a load pulse is generated once, and then, strobe signal becomes active for 128 m clock after load pulse completion. After that, operations are continued to the third step and to the fourth step.

Next, aforesaid procedures of signal transmission will be indicated with output symbols by means of operation. D−n [X] represents x-th bit of n-th element. It is assumed that n=0, 1, 2, 3, . . . , 639 and x=7 (MSB).

D0=D−0[7]
D1=0
D2=D−2[7]
D3=0
D4=D−4[7]
D5=0
D6=D−6[7]
D7=0

.

.

.

D636=D−636[7]
D637=0
D638=D−638[7]
D639=0
D640=0
D641=D−1[7]
D642=0
D643=D−3[7]
D644=0
D645=D−5[7]
D646=0
D647=D−7[7]

.

.

.

D1276=0
D1277=D−637[7]
D1278=0
D1279=D−639[7]

Figure 18:
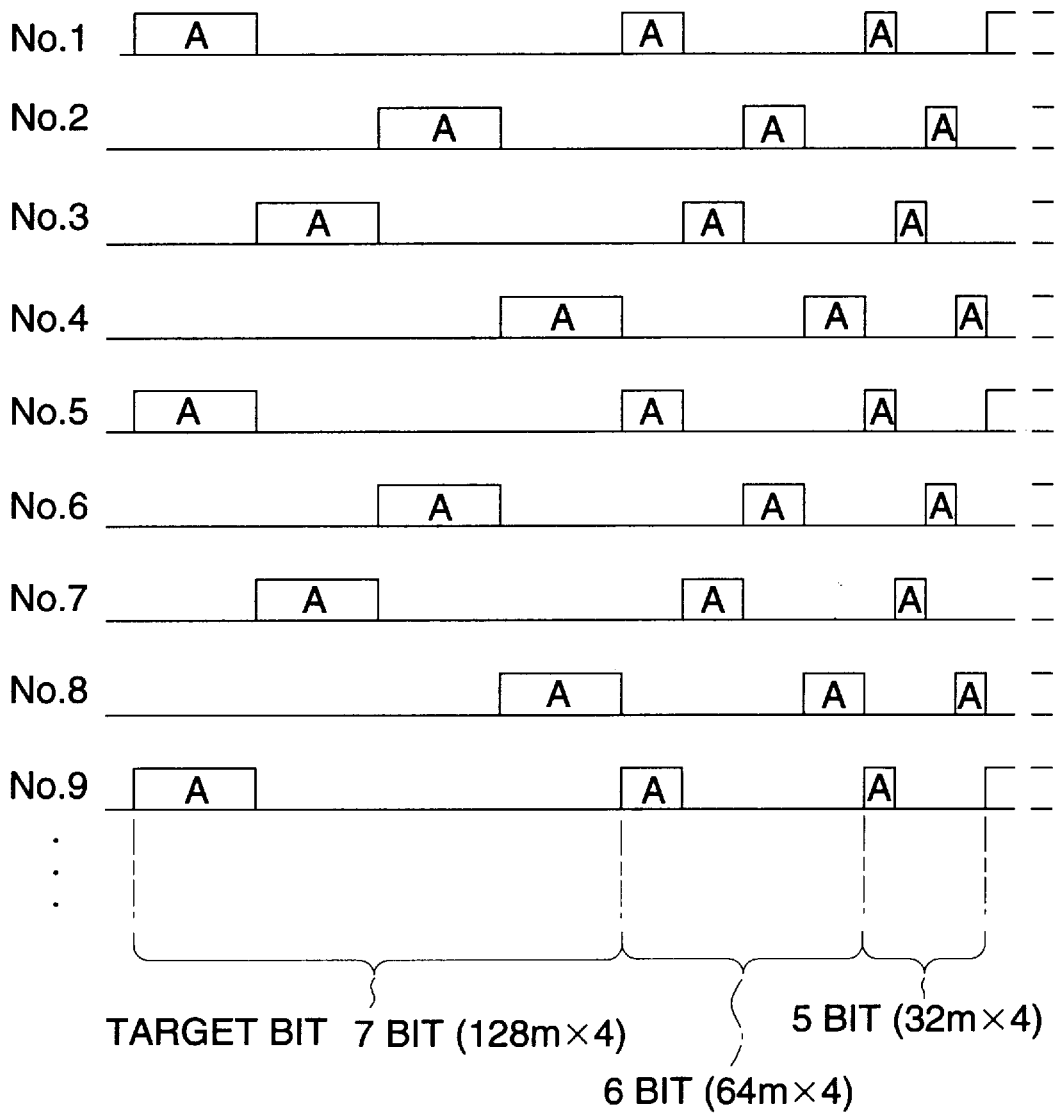
FIG. 18 is an illustration of operations showing a data timing signal control of the 4-division exposure system of the present invention.

Aforesaid signal transmission is repeated for D−n[6] in place of D−n[7]. However, strobe signal is 64 m clock respectively. (for the 3rd and 4th steps after the 2nd step in FIG. 18)

The signal transmission is further repeated for D−n[5] in place of D−n[7]. However, strobe signal is 32 m clock respectively. (for the 5th and 6th steps)

The signal transmission is further repeated for D−n[4] in place of D−n[7]. However, strobe signal is 16 m clock respectively. (for the 7th and 8th steps)

The signal transmission is further repeated for D−n[3] in place of D−n[7]. However, strobe signal is 8 m clock respectively. (for the 10th and 11th steps)

The signal transmission is further repeated for D−n[2] in place of D−n[7]. However, strobe signal is 4 m clock respectively. (for the 11th and 12th steps)

The signal transmission is further repeated for D–n[1] in place of D–n[7]. However, strobe signal is 2 m clock respectively. (for the 13th and 14th steps)

The signal transmission is further repeated for D–n[0] in place of D–n[7]. However, strobe signal is m clock respectively. (for the 15th and 16th steps)

After this, there are given an emitting time period for aforesaid recording element array 113 and a non-emitting time period (waiting time).for adjustment of quantity of light. When aforesaid operations are conducted, signal transmission for one line is completed. Total clock number excluding waiting time comes to {(640+1)×8+128 m+64 m+32 m+16 m+8 m+4 m+2 m+m}×2=10256+510 m.

Data, exposure time (clock number) and closest light-emitting element distance in the Example 3-3 are shown below.

Data 0≦d<256 Exposure time (clock number) d×m Closest light-emitting element distance 2

Figure 20:
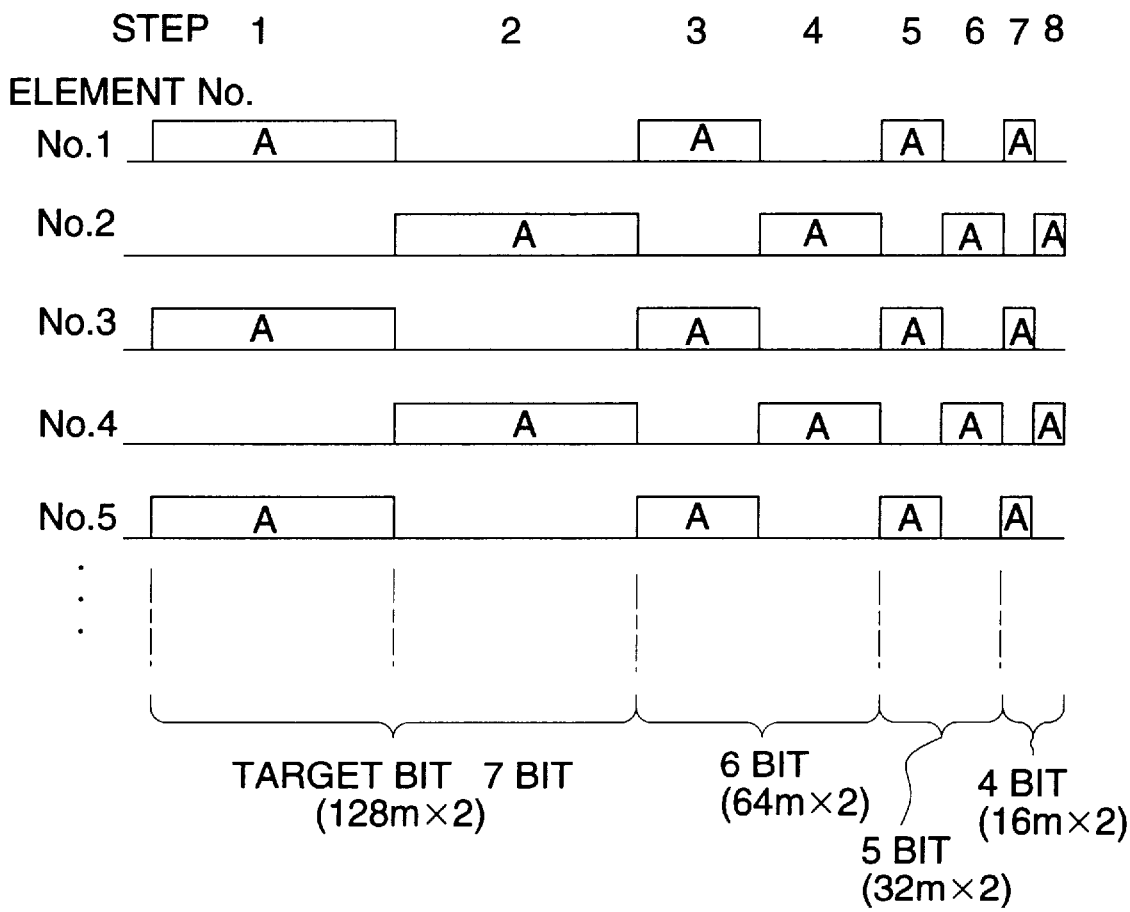
FIG. 20 is an illustration of operations showing the data timing signal control of the 2-division exposure system of the present invention.

FIG. 20 shows how the emitting timing in the occasion where aforesaid recording element array 113 in Example 3-3 is a light emitting element such as, for example, an LED array is controlled by data signal timing shown in FIG. 13. With regard to light-emitting element numbers, element No. 1, element No. 2, element No. 3, . . . are represented by the axis of ordinates, and steps 1, 2, 3, 4, . . . are represented by the axis of abscissas (time axis direction). "A" represents light-emitting timing for turning on or off in accordance with objective bit at positions of steps 1, 2, 3, 4, . . . each corresponding to each element number. For example, in a range of objective 7 bits (steps 1–2), if the objective bit is 1 at the step 1 in element No. 1 and at the step 2 in element No. 2, the driving is conducted with "A", and if the objective bit is 1 at the step 1 in element No. 3, the driving is conducted with "A". Further, with regard to 6 objective bits and 5 objective bits, if each objective bit is 1 at steps 3 and 4 and at steps 5 and 6 respectively, this shows that the driving is conducted with "A", and with regard to 4 objective bits, it is shown that the driving is conducted with "A" respectively at steps 7 and 8.

(Comparative Example 3-1)

Non-division exposure system

Figure 21:
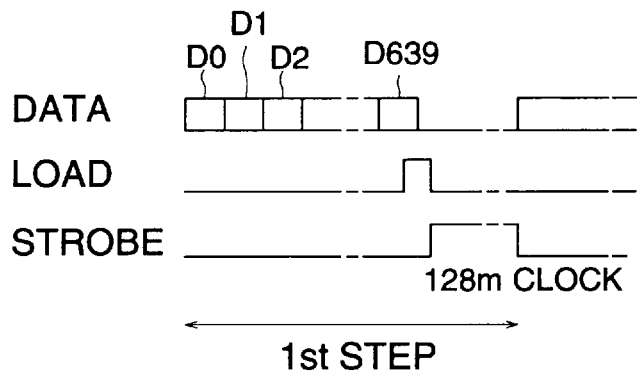
FIG. 21 is an illustration of operations showing the signal sending means of an undivided exposure system of the present invention.

A signal transmission means of a non-division exposure system shown in FIG. 21 will be explained below.

In the same manner as in FIG. 12, while being outputted from print head control circuit 121 (122 and 123), data signals D0, D1, D2, . . . , up to D639 are transmitted in the first step in the same way as in FIGS. 15, 17 and 19, and thereby a load pulse is generated once. Then, strobe signal becomes active during 128 m clock after completion of load pulse. After that, operations are continued to the second step, third step and to the fourth step.

Next, aforesaid procedures of signal transmission will be indicated with output symbols by means of operation.

D–n[X] represents x-th bit of n-th element. It is assumed that n=0 , 1, 2, 3, . . . , 639 and x=7 (MSB).

D0=D–0[7]
D1=D–1[7]
D2=D–2[7]
D3=D–3[7]
D4=D–4[7]
D5=D–5[7]
D6=D–6[7]
D7=D–7[7]
.
.
.
D636=D–636[7]
D637=D–637[7]
D638=D–638[7]
D639=D–639[7]

The signal transmission is further repeated for D–n[5] in place of D–n[7]. However, strobe signal is 32 m clock respectively. (for the third step)

The signal transmission is further repeated for D–n[4] in place of D–n[7]. However, strobe signal is 16 m clock respectively. (for the 4th step)

The signal transmission is further repeated for D–n[3] in place of D–n[7]. However, strobe signal is 8 m clock respectively. (for the 5th step)

The signal transmission is further repeated for D–n[2] in place of D–n[7]. However, strobe signal is 4 m clock respectively. (for the 6th step)

The signal transmission is further repeated for D–n[1] in place of D–n[7]. However, strobe signal is 2 m clock respectively. (for the 7th step)

The signal transmission is further repeated for D–n[0] in place of D–n[7]. However, strobe signal is m clock respectively. (for the 8th step)

After this, there are given an emitting time period for aforesaid recording element array 113 and a non-emitting time period (waiting time) for adjustment of quantity of light. When aforesaid operations are conducted, signal transmission for one line is completed. Total clock number excluding waiting time comes to (640+1)×8+128 m+64 m+32 m+16 m+8 m+4 m+2 m+m=5128+255 m.

Data, exposure time (clock number) and closest light-emitting element distance in the Comparative example 3-1 are shown below.

Data 0≦d<256 Exposure time (clock number) d×m Closest light-emitting element distance 1

Figure 22:
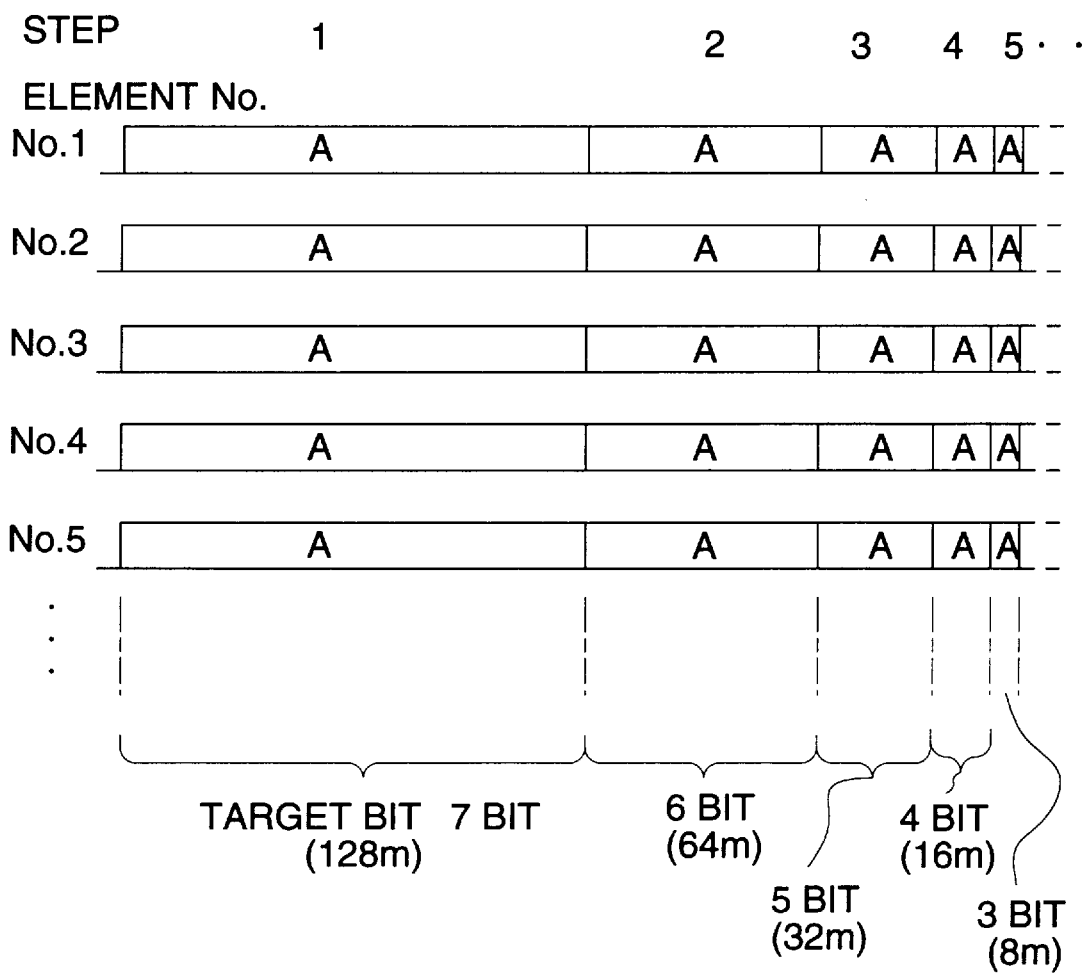
FIG. 22 is an illustration of operations showing the data timing signal control of the undivided exposure system of the present invention.

FIG. 22 shows how the emitting timing in the occasion where aforesaid recording element array 113 in Comparative example 3-1 is a light emitting element such as, for example, an LED array is controlled by data signal timing shown in FIG. 13. With regard to light-emitting element numbers, element No. 1, element No. 2, element No. 3, . . . are represented by the axis of ordinates, and steps 1, 2, 3, 4, . . . . are represented by the axis of abscissas (time axis direction) . "A" represents light-emitting timing for turning on or off in accordance with objective bit at positions of steps 1, 2, 3, 4, 5, . . . each corresponding to each element number. For example, in a range of objective 7 bits (step 1), if the objective bit is 1 for all elements, the driving is conducted with "A", in a range of objective 6 bits (step 2), if the objective bit is 1 for all elements, the driving is conducted with "A", in a range of objective 5 bits (step 3), if the objective bit is 1 for all elements, the driving is conducted with "A", in a range of objective 4 bits (step 4), if the objective bit is 1 for all elements, the driving is conducted with "A", and in a range of objective 3 bits (step 5), if the objective bit is 1 for all elements, the driving is conducted with "A".

Effects of maximum emitting duties and recording speed (in the case of wait time of zero) Examples 3-1, 3-2 and 3-3 and Comparative examples 3-1 are shown in Table 12 together with expressions m.

TABLE 12

|  | Example 3-1 | Example 3-2 | Example 3-3 | Comparative example 3-1 |
|---|---|---|---|---|
| Expressions | 252 m | 255 m | 255 m | 255 m |
|  | 15384 + | 20512 + | 10256 + | 5128 + |
|  | 252 m | 1020 m | 510 m | 255 m |
| m = 10 | 14% | 8% | 17% | 33% |
| m = 20 | 25% | 12% | 25% | 50% |
| m = 50 | 45% | 18% | 36% | 71% |
| m = 100 | 62% | 21% | 42% | 83% |
| m >> 1 | up to 100% | up to 25% | up to 50% | up to 100% |

As shown in FIG. 12, when a plurality of shift registers are provided, and when taking an arrangement wherein plural lines of data can be transmitted in parallel (clock number necessary for setting data comes to 1/n) or an arrangement wherein strobe signals and data c an be transmitted simultaneously (time for setting data for strobe signals is substantially unnecessary), data setting time (constant terms in denominator) becomes relatively smaller than recording time, which makes it possible for the smaller value of m to be closer to the duty for m >>1 in aforesaid Table 3.

Namely, in the arrangement mentioned above, recording time for obtaining the same maximum density in Example 3-1 is approximately a half of that in the 2-division exposure system in Example 3-3 and is approximately a quarter of that in the 4-division exposure system in Example 3-2.

Further, with regard to gradation, the number of gradation steps in Example 3-1 is 253 while that in Comparative example is 256, and there exist a portion where the same density is indicated for two data values. However, in general image output, a gradation strain is hardly detected visually.

In the method of evaluation for adjoining effect irregularity, intensity irregularity among recording element arrays 13 was corrected when it was driven, and uniform density pattern resulting in almost the same density was outputted at various density levels, and thus, a difference of irregularity pattern at each density (aforesaid driving time correcting method was not changed for different density levels) was evaluated visually. The results are shown below.

Example 3-1 ⊙ Excellent

Example 3-2 ⊙ Excellent

Example 3-3 Δ Fair

Comparative example 3-1 X Poor

In this case, in Example 3-1, almost same adjoining effect with that of Example 3-2 may be excluded under visual observation, density is at least 1.2 or more, or not less than 1.6 in spite of 2-division for data value of 64 or more and non-division for data value of 128 or more, resulting in a density zone where irregularity is not visible, or discrimination of irregularity is difficult. Aforesaid Example 3-3 is considerably improved in terms of irregularity compared with Comparative example 3-1, but irregularity in low density area is slightly visible.

Namely, in the past, adjoining effect irregularity and high speed recording have been in the antinomic relation. However, an improving method in the invention has made both of them to be compatible.

Next, applications to various recording systems in aforesaid image recording method will be explained as follows. First, applications to light-sensitive materials are shown in Table 13 below.

TABLE 13

| Images | Light-sensitive materials | Compatibility of the invention |
|---|---|---|
| Positive | Negative | Compatible |
| Positive | Positive | Incompatible |
| Negative | Negative | Incompatible |
| Negative | Positive | Compatible |

As a recording medium, in the case of reversal development in electrophotography which is typical in negative light-sensitive materials (medium wherein the longer the recording time is, the higher the density is), for example, it is necessary to shorten the recording time for the high density area, but adjoining effect appears in the high density area, as shown in Table 13. When it is a positive image, the irregularity can not be detected visually. When it is a negative image, the irregularity increases in the low density area in the case of negative/positive reversal, though irregularity of image itself is hardly discriminated, resulting in disadvantage in visual evaluation.

In the case of ordinary development in electrophotography which is typical in positive light-sensitive materials (medium wherein the longer the recording time is, the higher the density is) on the contrary, for example, it is necessary to shorten the recording time for the low density area. In this case, adjoining effect appears in the low density area. However, when it is a negative image, irregularity caused by negative/positive reversal is limited to the high density area, resulting in that irregularity can be not detected visually. In the case of a positive image, irregularity increases in the low density area, which results in disadvantage in visual evaluation. Though the explanation above is for a recording element array which is a light-emitting element array, it is also possible to reduce local and instantaneous accumulation and diffusion of heat and thereby to reduce irregularity in print density even for a recording element array employing a heater element such as a thermal print head, if the recording element array is driven on a time-division basis.

Next, application to a material of a silver halide photographic light-sensitive material will be explained as follows. As one of the characteristics of the silver halide photographic light-sensitive material (hereinafter referred to as photographic light-sensitive material), its characteristics curve contains a toe portion and a shoulder portion in addition to the straight portion. Therefore, in the image recording system wherein photographic light-sensitive materials are used, the method used in the invention can be applied widely regardless of the type of the recording system because the toe portion of the characteristics curve can reduce irregularity even in the case where irregularity appears in the low density area, though the method of the invention has been considered incompatible to image recording systems wherein irregularity appears in the low image density area in various recording systems. Further, in the invention, it is possible to confine irregularity caused by adjoining effect in non-linear portions (toe portion, shoulder portion) of the characteristics curve. In an ordinary high contrast recording material, portions corresponding to the toe portion and shoulder portion are not effective recording areas because they represent an area where output does not change for input.

Another characteristic of the photographic light-sensitive material is that the straight line portion of the characteristics curve has a gentle inclination compared with other general recording materials. Therefore, it has no function to emphasize extremely the irregularity in amount of entering light.

Further, owing to aforesaid characteristic, the photographic light-sensitive material has a function to improve image quality by multi-value gradation control. However, in the digital circuit system wherein clock frequency is restricted, data setting time and driving frequency are increased when the number of steps of gradation is increased, resulting in sacrifice of recording speed. In addition, when taking action for adjoining effect with division exposure, practical damage is serious. Therefore, the image recording method used in the invention is especially effective when realizing high image quality recording by using the photographic light-sensitive material.

In general recording process such as an electrophotography, its characteristic shows a linear relation between recording characteristics and an amount of exposure. In recording by means of photographic light-sensitive materials, on the other hand, its characteristic shows a linear relation between the recording and a logarithm of an amount of exposure. In the invention, a distance of simultaneous light-emitting elements is made short in an exposure area above the boundary of $2^{-1}$ or $2^{-2}$ of the maximum exposure amount, and it is considered that an influence of adjoining effect is caused by the foregoing. In the case of electrophotography, aforesaid boundary is from a relatively low exposure area, but in the case of an exposure system by means of photographic light-sensitive materials, aforesaid boundary is in a relatively high exposure area and a density area where the adjoining effect appears is limited to an extremely narrow density area. In other words, it shows that recording characteristics are especially stable against the fluctuation of a unit exposure amount in the case of photographic light-sensitive materials, and it is understood that an extremely high effect can be obtained by an image recording method employing a method of division exposure with a limited density area like that in the invention. Incidentally, although the present example shows image data of 8 bits (256 gradations), the same effect can be obtained by the same method even when image data of 12 bits (4096 gradations) is used for the high image quality recording.

Further, even in the case of a heating recording element such as a thermal head, there can be observed an effect to eliminate irregularity caused on a chip terminal without lowering the recording speed in the same method.

There were provided a recording element in a form of an array with one row or plural rows and a control means for controlling driving time or driving frequency for the recording element for recording plural pixels at multi-value gradations, and an arrangement was made to control so that the distance between closest driven elements which are driven simultaneously can be surely changed depending on density level in an area close to a pixel to be recorded by the recording element. Therefore, it was possible to reduce necessary time for driving, to reduce an adjoining effect and to control uniforming of image density at all density levels when correcting driving time at a specific rate for each element, by controlling each element corresponding to a pixel so that the distance between closest elements which are driven simultaneously in accordance with a density area in the vicinity of a pixel to be recorded. Thus, it was possible to obtain excellent images.

When the recording element control means controlled so that when a density level of the area close to a pixel to be recorded by the recording element is high, the distance between closest driven elements driven simultaneously is small, and when a density level of the area close to a pixel to be recorded by the recording element is low, the distance between closest driven elements driven simultaneously is great, it was possible to reduce necessary time for driving, to reduce an adjoining effect and to control uniforming of image density at all density levels when correcting driving time at a specific rate for each element, and thereby to obtain excellent images, by making the distance between plural elements driven simultaneously small, especially in the case of forming positive images.

An arrangement was made so that when n (n is a natural number) represents a distance between closest driven elements of the recording elements driven simultaneously in the vicinity area when density signals for all pixels in any vicinity area are above the boundary of a density signal area, 2n represents a distance between closest driven elements of the recording elements driven simultaneously in the vicinity area when density signals for all pixels in any vicinity area are lower than the boundary of a density signal area. In the arrangement mentioned above, there was made another arrangement wherein a total signal area contains one or plural signal area boundaries in which a signal area boundary is in the vicinity of maximum value $2^{-k}$ of driving time for one element, and 2n represents a pitch of elements which can be driven simultaneously among elements having driving time shorter than the signal area boundary, and n represents a pitch of elements which can be driven simultaneously among elements having driving time longer than 2n. Therefore, it was possible to reduce necessary time for driving, to reduce an adjoining effect and to control uniforming of image density at all density levels when correcting driving time at a specific rate for each element, and thereby to obtain excellent images.

Owing to the arrangement wherein aforesaid recording element is controlled to be turned on and off by aforesaid control means in accordance a value of each digit of image data represented by m-digit binary number, and aforesaid recording element in the state of ON is driven corresponding to the weight of its digit, and there is conducted the recording of density in $2^m$ steps in a range of $0-(2^m-1)$ for aforesaid image data of each pixel, thus, a simple logic gate is added by making the density signal area boundary to be $2^{m-1}, 2^{m-2}, \ldots, 2^k$ (k is an integer not less than 1 and not more than m–1) in opposition to a multi-value gradation control by means of a conventional binary-weighted multi-step exposure system, it was possible to realize rationally the division exposure control depending on a density level, and further to shorten the necessary time for driving.

When a light-sensitive recording material is composed of silver halide grains, it was possible to reduce necessary time for driving, to reduce an adjoining effect and to control uniforming of image density at all density levels when correcting driving time at a specific rate for each element, and thereby to obtain excellent images, by controlling the distance between closest elements driven simultaneously depending on a density area in the vicinity of a pixel to record each element corresponding to plural pixels.

What is claimed is:

1. An apparatus for forming an image on a silver halide light sensitive material, comprising:

a group of recording elements including a plurality of recording elements aligned in an array form of at least a single line, each recording element emitting light onto the silver halide light sensitive material;

a memory in which correction data to eliminate irregularities in light amount among the plurality of recording elements are stored for each recording element; and a control apparatus for correcting image data of each pixel based on the correction data for each recording element, and for controlling each recording element so as to emit light intermittently plural times for each pixel in accordance with the corrected image data, wherein the control apparatus divides the plurality of recording elements into plural sub-groups and controls the plurality of recording elements in such a way that while one sub-group of the plurality of recording elements is in an operable condition as working elements, neighboring recording elements of another sub-group located next to the working elements are controlled to be in an inoperable condition as non working elements.

2. The apparatus of claim 1, wherein the silver halide light sensitive material comprises a reflective supporting member.

3. The apparatus of claim 1, wherein the plurality of recording elements are divided into N pieces sub-groups, where N is a natural number not smaller than 2 and a recording element in a same sub-group is selected from every (N-1) pieces in the array form, and wherein while the control apparatus puts one sub-group in operable condition, the control means puts another sub-group in inoperable condition.

4. The apparatus of claim 3, wherein the apparatus comprises a plurality of groups of recording elements, and N of at least one of the plurality of groups of recording elements is not less than 4.

5. The apparatus of claim 1, wherein the group of recording elements has a pixel arrangement density not less than 200 dpi.

6. The apparatus of claim 1, further comprising a conveyor for conveying the recording medium relatively in a predetermined direction perpendicular to an aligning direction of the plurality of recording elements.

7. An apparatus for forming an image on a recording medium comprising:

a group of recording elements including a plurality of recording elements aligned in an array form of at least a single line; and a control apparatus for controlling each recording element so as to be driven plural times for each pixel in accordance with image data, said control apparatus controlling the plurality of recording elements such that while one of the plurality of recording elements is in an operable condition as a working element, neighboring recording elements located next to the working element are controlled to be in an inoperable condition as non working elements, wherein the group of recording elements comprises a vacuum fluorescent tube array whose anode voltage and grid voltage are controllable, and wherein the control apparatus controls the vacuum fluorescent tube array so as to be driven under a condition such that the ratio of the anode voltage to the grid voltage is 0.3 to 0.9.

8. An apparatus for forming an image on a recording medium comprising:

a group of recording elements including a plurality of recording elements aligned in an array form of at least a single line; and a control apparatus for controlling each recording element so as to be driven plural times for each pixel in accordance with image data, said control apparatus controlling the plurality of recording elements such that while one of the plurality of recording elements is in an operable condition as a working element, neighboring recording elements located next to the working element are controlled to be in an inoperable condition as non working elements, wherein a driven amount of each recording element is corrected so as to eliminate deviation in the driven amount, wherein light amount data of each recording element is obtained while the plurality of recording elements are driven, a correction value is determined for each recording element based on the light amount data, and the driven amount of each recording element is corrected based on the correction value, and wherein the recording medium comprises a silver halide light sensitive material, each recording element emits light to expose the silver halide light sensitive material while the plurality of recording elements are driven, and the light amount data is obtained by measuring density data on the exposed silver halide light sensitive material.

9. The apparatus of claim 8, wherein a relation between the density data and the light amount data is obtained, the density data are converted into the light amount data based on the relation so that the correction value is obtained for each recording element.

10. An apparatus for forming an image on a recording medium comprising:

a group of recording elements including a plurality of recording elements aligned in an array form of at least a single line; and a control apparatus for controlling each recording element so as to be driven plural times for each pixel in accordance with image data, said control apparatus controlling the plurality of recording elements such that while one of the plurality of recording elements is in an operable condition as a working element, neighboring recording elements located next to the working element are controlled to be in an inoperable condition as non working elements, wherein a driven amount of each recording element is corrected so as to eliminate deviation in the driven amount, wherein light amount data of each recording element is obtained while the plurality of recording elements are driven, a correction value is determined for each recording element based on the light amount data, and the driven amount of each recording element is corrected based on the correction value, wherein first light amount data is obtained by measuring a light amount of each recording element while the plurality of recording elements are driven, and wherein second light amount data is obtained by measuring a light amount of each recording element while each recording element is solely driven, and the correction value is determined for each recording element based on the first light amount data and the second light amount data.

11. An apparatus for forming an image on a recording medium comprising:

a group of recording elements including a plurality of recording elements aligned in an array form of at least a single line; and a control apparatus for controlling each recording element so as to be driven plural times for each pixel in accordance with image data, said control apparatus controlling the plurality of recording elements such that while one of the plurality of recording elements is in an operable condition as a working element, neighboring recording elements located next to the working element are controlled to be in an inoperable condition as non working elements, wherein a driven amount of each recording element is corrected so as to eliminate deviation in the driven amount, wherein light amount data of each recording element is obtained while the plurality of recording elements are driven, a correction value is determined for each recording element based on the light amount data, and the driven amount of each recording element is corrected based on the correction value, and wherein the apparatus comprises a plurality of groups of recording elements, and at least one group is controlled to emit light in not less than 512 gradations and not more than 65536 gradations.

12. An apparatus for forming an image on a recording medium comprising:

a group of recording elements including a plurality of recording elements aligned in an array form of at least a single line; and a control apparatus for controlling each recording element so as to be driven plural times for each pixel in accordance with image data, said control apparatus controlling the plurality of recording elements such that while one of the plurality of recording elements is in an operable condition as a working element, neighboring recording elements located next to the working element are controlled to be in an inoperable condition as non working elements, wherein the control apparatus changes a gap distance between nearest working elements in accordance with a density level in the neighborhood of pixels recorded by the working elements, and the nearest working elements are located nearest to each other among the working elements.

13. The apparatus of claim 12, wherein the control apparatus controls the gap distance in such a way that the gap distance is reduced when the density level in the neighborhood of the pixels is high, and the gap distance is increased when the density is low.

14. The apparatus of claim 13, wherein the pixels are located in an image region having a critical density, where the gap distance "n" is a natural number when the density level in the neighborhood of the pixels is higher than the critical density, and the gap distance is "2n" when the density level in the neighborhood of the pixels is lower than the critical density.

15. The apparatus of claim 14, wherein the image data is expressed with a binary number in a form of "m" figures, the control apparatus controls the recording elements so as to be switched on or off in accordance with a value of each figure, and a recording element switched on is driven in accordance with a weight of each figure so that each pixel is recorded with a density level within a density level range of 0 to $(2^{m-1})$ and the critical density of the image region is one of $2^{m-1}, 2^{m-2}, ---, 2^k$ (k being an integer not smaller than 1 or not larger than −1).

16. An apparatus for forming an image on a silver halide light sensitive material, comprising:

red, green and blue recording heads each including a plurality of recording elements aligned in an array form of at least a single line, each recording element emitting light onto the silver halide light sensitive material; and a control apparatus for controlling each recording element so as to emit light intermittently plural times for each pixel in accordance with image data, wherein the control apparatus divides the plurality of recording elements of at least the green recording head into plural groups, and controls the plurality of recording elements such that while one group of the plurality of recording elements is in an operable condition as working elements, neighboring recording elements located next to the working elements are controlled to be in an inoperable condition as non working elements.

* * * * *